(12) United States Patent  
Sunderland

(10) Patent No.: US 11,767,474 B2  
(45) Date of Patent: *Sep. 26, 2023

(54) HIGH TEMPERATURE BIO-CHAR CARBONIZATION AND MICRON GRINDING AND CLASSIFICATION FOR INCLUSION INTO MASTER BATCH POLYMERIZATION

(71) Applicant: Thomas Jefferson University, Philadelphia, PA (US)

(72) Inventor: Mark Sunderland, Philadelphia, PA (US)

(73) Assignee: Thomas Jefferson University, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,865

(22) Filed: Feb. 11, 2021

(65) Prior Publication Data

US 2021/0163824 A1 Jun. 3, 2021

Related U.S. Application Data

(63) Continuation-in-part of application No. 16/811,719, filed on Mar. 6, 2020, now Pat. No. 10,927,304, (Continued)

(51) Int. Cl.
*C10B 53/02* (2006.01)
*C10B 57/16* (2006.01)
(Continued)

(52) U.S. Cl.
CPC .......... *C10B 53/02* (2013.01); *B02C 17/186* (2013.01); *B02C 23/12* (2013.01); *C08J 3/226* (2013.01);
(Continued)

(58) Field of Classification Search
CPC .. Y02E 50/14; C10B 53/02; C08J 3/20; C08J 3/22; C08J 3/226; C10J 2300/0916; C10J 2300/092
See application file for complete search history.

(56) References Cited

U.S. PATENT DOCUMENTS 7,820,058 B2 10/2010 Yoon et al.
8,277,691 B2 10/2012 Lu
(Continued)

FOREIGN PATENT DOCUMENTS

AU 2008316035 B2 10/2013
CA 2785100 A1 7/2011
(Continued)

OTHER PUBLICATIONS

"Specialty Crops Factsheet: Industrial Hemp", British Columbia Ministry of Argiculture and Food, Sep. 1999.
(Continued)

*Primary Examiner* — Jonathan Luke Pilcher
(74) *Attorney, Agent, or Firm* — Vos-IP, LLC

(57) ABSTRACT

A thermal process for carbonizing hemp and reducing particle size, mechanically, by grinding or milling said carbonized hemp materials to generate a precise particle size hemp char and combining the hemp char particles with a polymer into a master batch.

18 Claims, 11 Drawing Sheets

Related U.S. Application Data which is a continuation of application No. 16/395,515, filed on Apr. 26, 2019, now Pat. No. 10,619,102.

(60) Provisional application No. 62/790,722, filed on Jan. 10, 2019, provisional application No. 62/663,731, filed on Apr. 27, 2018.

(51) Int. Cl.
  *C08K 3/04* (2006.01)
  *C08J 3/22* (2006.01)
  *B02C 17/18* (2006.01)
  *B02C 23/12* (2006.01)

(52) U.S. Cl.
  CPC .............. *C08K 3/04* (2013.01); *C10B 57/16* (2013.01); *C08J 3/22* (2013.01); *C08J 2300/12* (2013.01); *C08K 2201/001* (2013.01); *C08K 2201/005* (2013.01); *C08K 2201/011* (2013.01); *Y02E 50/10* (2013.01)

(56) References Cited

U.S. PATENT DOCUMENTS

| | | | |
|---|---|---|---|
| 10,233,129 | B2 | 3/2019 | Kim et al. |
| 10,276,876 | B2 | 4/2019 | Kim et al. |
| 10,619,102 | B2 * | 4/2020 | Sunderland .............. C08K 3/04 |
| 10,913,900 | B2 * | 2/2021 | Sunderland ........... B02C 17/186 |
| 10,927,304 | B2 * | 2/2021 | Sunderland ............. C10B 57/16 |
| 2012/0196140 | A1 | 8/2012 | Deng et al. |
| 2017/0096375 | A1 | 4/2017 | Kim et al. |
| 2017/0098827 | A1 | 4/2017 | Kim et al. |
| 2017/0267859 | A1 | 9/2017 | Uchida et al. |
| 2019/0330532 | A1 | 10/2019 | Sunderland |

FOREIGN PATENT DOCUMENTS

| | | |
|---|---|---|
| CN | 101967416 A | 2/2011 |
| EP | 2616516 B1 | 7/2015 |
| EP | 2526556 B1 | 9/2015 |

OTHER PUBLICATIONS

Averink, Global Water Footprint of Industrial Hemp Textile, Sep. 2015.
Banks, et al., A New Textiles Economy: Redesigning Fashion's Future, Nov. 28, 2017.
Baxter, et al., "Growing Industrial Hemp in Ontario", Aug. 2000, www.omafra.gov.on.ca/english/crops/facts/00-067.htm.
Brook, et al., Industrial Hemp Harvest and Storage: Best Management Practices, Nov. 10, 2015.
CAB International, "*Cannabis sativa* (Hemp) Datasheet", Invasive Species Compendium, Nov. 6, 2018, www.cabi.org/isc/datasheet/14497.
Canadian Hemp Trade Alliance, Hemp Production eGuide, 2018, www.hemptrade.ca/eguide.
Carpenter, "In Kentucky, Farmers Find Hemp May Be More Profitable Than Tobacco", Forbes, Aug. 28, 2018, www.forbes.com/sites/workday/2019/06/18/5-steps-financial-leaders-can-take-to-cultivate-innovation/#21e703bf5a30.
Cherrett, et al., Ecological Footprint and Water Analysis of Cotton, Hemp and Polyester, 2005.
Collier, et al., Textile Testing and Analysis, 1999.
Danish Fashion Institute, "Material Snapshot: Hemp", Jun. 7, 2018, designforlongevity.com/articles/material-snapshot-hemp.
Dvorak, "History of Hemp in America", CBD Oiled, 2004, cbdoiled.com/history-of-hemp-in-america/.
FabricLink, "Fiber Characteristics: Hemp", www.fabriclink.com/University/Hemp.cfm.
Giorcelli, "Biochar as a High Performance Low Cost Filler for Polymer Composites", 3rd Edition of International Conference and Exhibition on Polymer Chemistry, Mar. 26-28, 2018, 58.
Günther, "Carbon Sequestration for Everybody: Decrease Atmospheric Carbon Dioxide, Earn Money and Improve the Soil", Energy and Environment, Mar. 27, 2007.
James, "Top 6 Hemp Growing Countries: USA Now Ranks No. 3!", Ministry of Hemp, Apr. 22, 2019, ministryofhemp.com/blog/hemp-growing-countries/.
Johnson, "Hemp as an Agricultural Commodity", Congressional Research Service, Jun. 22, 2018.
Johnston, "The Environmental Benefits of Industrial Hemp", Virginia Industrial Hemp Coalition, Feb. 2016.
Manitoba Agriculture, "Industrial Hemp Production and Management", www.gov.mb.ca/agriculture/crops/production/hemp-production.html.
Manning, et al., "US President Donald Trump Signs 2018 Farm Bill Into Law", Produce Grower, Dec. 21, 2018, www.producegrower.com/article/us-president-donald-trump-sign-2018-farm-bill-law/.
Montford, et al., "A Comparison of the Biodiversity Friendliness of Crops With Special Reference to Hemp (*Cannabis sativa* L.)", Journal of the International Hemp Association, vol. 6 No. 2, Dec. 1999, 53-63.
Newland, "Hemp Politics—Why Was Hemp Made Illegal in 1937?", CBD Oiled, cbdoiled.com/why-was-hemp-made-illegal-in-1937/.
O'Connell, "How Hemp Can Heal Our Soil & Why It Matters to Consumers", Ministry of Hemp, Apr. 27, 2017.
Palmer, "High on Environmentalism", Slate, Apr. 12, 2011, slate.com/technology/2011/04/hemp-versus-cotton-which-is-better-for-the-environment.html.
Retsch GmbH, High Energy Ball Mill Emax—The Revolution in Ultrafine Grinding, Mar. 12, 2014.
Roth, et al., "Industrial Hemp Production", Penn State Extension: Agricultural Alternatives, Jul. 2, 2018.
Salentijn, et al., "New Developments in Fiber Hemp (*Cannabis sativa* L.) Breeding", Industrial Crops and Products, vol. 68, Sep. 2, 2014, 32-41.
Schiller, "President Trump Signs 2018 Farm Bill, Legalizing Hemp", Cannabis Business Times, Dec. 20, 2018, www.cannabisbusinesstimes.com/article/president-trump-signs-2018-farm-bill-legalizing-hemp/.
Small, et al., "Hemp: A New Crop with New Uses for North America", Trends in New Crops and New Uses, 2002, 284-326.
Van Der Werf, et al., "The Environmental Impacts of the Production of Hemp and Flax Textile Yarn", Industrial Crops and Products, vol. 27, No. 1, Jan. 2008, 1-10.
Voorhees, "An Introduction to Dry Powder Classification", Powder and Bulk Engineering, vol. 32, No. 2, Feb. 2018, 22-25.
Wicker, "Could Hemp Fashion Be the Key to Fixing India's Cotton Economy?", Forbes, Oct. 23, 2017, www.forbes.com/sites/ashoka/2017/10/23/could-hemp-fashion-be-the-key-to-fixing-indias-cotton-economy/#6518ae43106a.

\* cited by examiner

Wet Milling

3D Carbon @ 15,000×

3D Carbon

"Flat Carbon" Graphene @ 15,000×

"Flat Carbon" Graphene

HIGH TEMPERATURE BIO-CHAR CARBONIZATION AND MICRON GRINDING AND CLASSIFICATION FOR INCLUSION INTO MASTER BATCH POLYMERIZATION

CROSS-REFERENCE TO RELATED APPLICATIONS

This application is a continuation-in-part of U.S. patent application Ser. No. 16/811,719 filed on Mar. 6, 2020, which is a continuation of U.S. patent application Ser. No. 16/395,515 filed on Apr. 26, 2019, which claims the benefit of U.S. Provisional Patent Application No. 62/663,731 filed on Apr. 27, 2018, and U.S. Provisional Patent Application No. 62/790,722 filed on Jan. 10, 2019, with the United States Patent and Trademark Office, the contents of which are incorporated herein by reference in their entirety.

FIELD OF THE INVENTION

The present application is generally related to processes and methods for forming charred or carbonized hemp-based materials capable of being utilized in master batch processes with the charred materials having enhanced physical properties and/or conductive properties for use in fibers and other materials, through the formation of micron-sized carbonized particles.

BACKGROUND OF THE INVENTION

Char is made by heating a cellulosic material in a low oxygen environment at a temperature of between 600-700° C., with higher temperatures unnecessary for current processing needs. This process typically takes between 12-72 hours, though longer periods are possible, and the process burns off volatile compounds such as water, methane, hydrogen, and tar. In commercial processing, the burning takes place in large concrete or steel silos with very little oxygen, and the burning stops before the material turns to ash. The process leaves black lumps and powder, about 25% of the original weight.

Historically, char referred to charcoal, which was used for cooking and heating. The process of making charcoal is ancient, with archaeological evidence of charcoal production going back about 30,000 years. Making charcoal is modernly practiced throughout the world. Indeed, individuals utilize cellulosic matter, which is burned or charred at low oxygen conditions, to generate charcoal. When ignited, the carbon in charcoal combines with oxygen and forms carbon dioxide, carbon monoxide, water, other gases, and significant quantities of energy. The quantity of energy is the salient feature as charcoal packs more potential energy per ounce than raw wood. Furthermore, charcoal burns steady, hot, and produces less smoke and fewer dangerous vapors. Because charcoal burns hotter, cleaner, and more evenly than wood, it was used by smelters for melting iron ore in blast furnaces, and blacksmiths who formed and shaped steel, among other uses.

Many societies around the world use charcoal for cooking and heating purposes when no other heat sources are readily available. Even in modern metropolises, hardwood lump charcoal is fashionable for the same reasons that "organic" food is fashionable, and it has obtained an aura of being more natural, has increased flavor, and is a better way to cook. There are more than 75 brands of charcoal and some are even varietal including: cherry, mesquite, coconut shell, tamarind, etc. Each of these varietals are essentially identical, except for their plant origins and traces of oils defining their unique scents and raw source material.

Hardwood lump charcoal is frequently made from hardwood scrap from sawmills and from flooring, furniture, and building materials manufacturers. However, absent such scrap material, sources often include branches, twigs, blocks, trim, and other scraps for generating the material. The result of such variety of material is lumps that are irregular in size, often looking like limbs and lumber. Often, this material is carbonized to different degrees because the different sized lumps lead to slight differences in burn and temperature among the materials. Lump is particularly valued for cooking as it leaves little ash since there are no binders as with manufactured charcoal, thus leaving a cleaner product than manufactured charcoal, and supposedly provides natural flavors for cooking. Certain charcoals contain additional fillers or accelerators, to aid in combustion, while others, e.g., binchotan, burn at much higher temperatures due to its particular processing.

Interestingly, as wood and other cellulosic materials are carbonized, the material structurally changes into simple carbon structures. This has been historically utilized for its absorptive properties, for example in filtering wastewater as well as binding body toxins. Large amounts of carbon are utilized for these purposes in numerous industries. Furthermore, in certain instances, these structures may store or conduct small amounts of electrical charges, whereas non-carbonized cellulosic material does not conduct electricity. However, little, if any, carbonized material is currently used for such electrical property, as these materials still fall below transmission rates for classically transmitting materials for transmitting electrical charges or storing electrical charges, such as metallic based materials.

Carbon products based on hemp have heretofore been neglected. This neglect is due to numerous reasons including the significant difficulties with the plant's mechanical structure, generation of sticky resin substances on the stalk during retting, its light mass and density, and presence of certain metabolites and cannabinoids, which have generally precluded its use. The processes and methods described herein advantageously provide new methods and processes to generate micron-sized particles from hemp-based cellulosic materials, which are advantageously utilized in master batches for certain industrial processes, including fiber formation, film formation, and composite formation, among other uses.

SUMMARY OF THE INVENTION

A process for generating a mixture of substantially homogeneous particle size hemp char comprising: carbonizing hemp at a temperature of at least 1100° C. under low oxygen conditions to create a char; milling said char to create a milled char having an irregular polyhedron shape; classifying the milled char using a classification system having at least one gradient of 2 microns in size; and capturing the material under 2 microns in size.

In a preferred embodiment, material greater than 2 microns in size is added to an unmilled char and remilled to reduce the size of the material, wherein preferably char of smaller than 2 microns is collected. In a preferred embodiment, the char is processed through a single classification system, wherein the classification gradient or screen is 2 microns.

In a preferred embodiment, a classification system comprising at least two gradients, a first of about 2 microns and a second of about 5 microns; wherein material greater than 5 microns is removed, material between 2 and 5 microns is captured, and material smaller than 2 microns is captured.

In a preferred embodiment, material greater than 5 microns in size is added to a char and remilled to reduce the size of the material.

In a preferred embodiment, the hemp is dried hemp, having been cut and dried for no more than 7 days.

In a preferred embodiment, the milling process comprises a dry milling process.

In a preferred embodiment, the milling process comprises a dry milling process using ball milling, air jet milling, ultrafine grinding, grinding, or combinations thereof.

In a preferred embodiment, the substantially homogeneous particles comprise 99% of particles less than 2 microns in size.

In a preferred embodiment, the substantially homogeneous particles under 2 microns in size comprise at least 50% of particles between 1 and 2 microns.

In a preferred embodiment, the substantially homogeneous particles comprise at least 70% of particles between 1 and 2 microns.

In a preferred embodiment, the substantially homogeneous particles under 2 microns in size comprise at least 90% of particles between 1 and 2 microns.

In a preferred embodiment, the milling process comprises a further step of reducing the temperature of the char to less than −100° C. temperature; and milling the char at below −100° C.

In a preferred embodiment, the milling process, further comprises a drying process to reduce moisture content of the (milled material) to less than 5% water.

In a preferred embodiment, the milling process comprises a cryo milling process, wherein the mill is cooled to below −100° C., typically with liquid nitrogen or other liquid with temperatures lower than −100° C.

In a preferred embodiment, the milling process is a wet milling process, wherein the wet solvent and said wet solvent contains less than 5% water, and most preferably is a nonaqueous solvent.

In a preferred embodiment, a process for creating a mixture of micron-sized char having a specific classification size, comprising: charring a portion of hemp stalk at a temperature of greater than 1100° C. and collecting the charred hemp stalk; milling the charred hemp stalk for a sufficient amount of time to generate a portion of micron-sized hemp char having an irregular polyhedron shape; placing the portion of micron-sized hemp char into a classification system comprising at least one classification screen of less than 10 microns; collecting the classified fraction of micron-sized hemp char. In preferred embodiments, the hemp stalk is rough chopped before being charred. In preferred embodiments, the classification screen is less than 5 microns or less than 2 microns. In preferred embodiments, collecting the classified fraction of micron-sized hemp char includes collection of a desired fraction and collecting a rejected fraction which is remilled to reduce the size of the hemp char.

In a preferred embodiment, a thermal energy process for generating a specific classification size of nano particles of a cellulosic material, wherein said particles are charred and ground to a micron size and are capable of having high conductive properties, which can be combined in a master batch, for example with a polymeric substrate, which can be further used to produce a fiber, yarn, or other material suitable for weaving, knitting or of binding these materials into fabrics. Preferably, the cellulosic material is hemp, and most preferable, the hemp comprises hemp stalk (which contains fiber and hurd). In a preferred embodiment, the micron size is less than 10, less than 5, or less than 2 microns in size.

A preferred embodiment is directed towards a process of carbonization of hemp stalk in combination with a polymeric substrate, wherein the carbonized hemp stalk is milled to less than 2 microns in size and is combined in a master batch with a polymer, wherein said carbonized hemp and polymer is capable of conductivity.

A preferred embodiment is directed towards a process of generating a nonmetallic fiber capable of conductivity comprising: carbonizing hemp in a furnace, said furnace being flushed with nitrogen and then and heated to at least 1100° C. in 60 minutes (14.6° C./min heat ramp); wherein the at least 1100° C. is held for at least 60 minutes; nitrogen flow is maintained over the heating and hold times to maintain a low oxygen environment; removing the hemp from the furnace and cooling it to room temperature; milling the cooled hemp to a particle size of less than 10 microns; combining the milled hemp into a polymer and extruding a fiber. Preferably, wherein the particle size is less than 5 microns, and more preferably wherein the arithmetic mode particle size is between 1 and 2 microns, and more preferably wherein the arithmetic mean particle size is between 1 and 2 microns. In a preferred embodiment, the milled hemp is classified with a micron-sized classification screen and the classified material is collected in fractions according to a desired size for master batch processing.

In preferred embodiments, the process wherein at least 90% of the hemp particles are of less than 10 microns, or more preferably wherein at least 99% of the particles are of less than 10 microns. In preferred embodiments, wherein the milled hemp comprises between 1 and 50% of the total weight of an extruded fiber, more preferably, wherein the milled hemp comprises between 1 and 25% of the total weight of an extruded fiber. In certain embodiments, wherein the milled hemp comprises between 1 and 10% of the total weight of an extruded fiber, wherein the extruded fiber comprises a polymer.

A further embodiment is directed towards a method of manufacturing a nonmetallic fiber having a portion of carbonized particles and at least one polymer comprising: carbonizing a portion of hemp material in a furnace, said furnace being flushed with nitrogen and then and heated to at least 1100° C. in about 60 minutes (at least 10° C./min heat ramp, with typical heating at 14.6° C./min heat ramp or greater); wherein the at least 1100° C. is held for 60 to 90 minutes; nitrogen flow is maintained over the heating and hold times to maintain a low oxygen environment; removing the hemp from the furnace and cooling it to room temperature; milling the cooled hemp to a particle size of less than 10 microns by a milling process for a period sufficient to reduce the hemp into an average particle size of less than 50 microns; combining the milled hemp with the at least one polymer, wherein the ratio of hemp particles to polymer is between 10:90 and 50:50; mixing the polymer and the hemp particles; and extruding a fiber.

In a preferred embodiment, the average particle size is less than 25 microns, and wherein at least 90% of all particles are less than 50 microns in size, more preferably, wherein the average particle size is less than 10 microns and wherein at least 90% of all particles are less than 25 microns in size. In other embodiments, it is preferable to generate a fiber wherein the average particle size is between 1 and 2 microns and having an irregular polyhedron shape, and wherein at least 90% of all particles are less than 10 microns in size, and most preferably wherein the average particle size is less than 2 microns and at least 95% of all particles are less than 2 microns in size.

A preferred embodiment comprises a carbonized hemp particle, having an average particle size of less than 25 microns, and at least 90% of all particles of less than 50 microns, combined with a suitable polymer to generate a fiber, yarn, or polymer for subsequent processing.

In a preferred embodiment, a process for creating a mixture of micron-sized charred hemp comprising: rough cutting a portion of hemp stalk; charring the portion of hemp stalk at a temperature of greater than 1100° C. to create a char material; milling the char material to create a milled char having an irregular polyhedron shape; classifying the milled char with a classification system of less than 2 microns in size to create a fraction of hemp char particles; and collecting a desired fraction from the classification system of hemp char particles.

In a further embodiment, the process further comprising a first step of drying the hemp stalk before the rough cutting step.

In a further embodiment, the process wherein the temperature of greater than 1100° C. is held for at least one hour, and wherein the charring process is performed by addition of a nonoxygen gas to a heating chamber.

In a further embodiment, the process wherein the milling is performed in a high energy ball mill.

In a further embodiment, the process wherein the classification system includes a classification of 2 microns or less.

In a further embodiment, the process wherein the desired fraction from the classification system is admixed with a polymer. In a further embodiment, the process wherein the desired fractions from the classification system admixed with a polymer transmit an electrical charge with a resistance of less than 100 Ω.

In a further embodiment, the process wherein the desired fraction from the classification system comprises a 95% specific classification size of less than 2 microns and a 95% bell curve of 1.5 microns.

In a further embodiment, a process for generating a mixture of nanosized hemp char particles having a greater than 90% specific classification size of less than 2 microns comprising: charring a portion of hemp stalk within a furnace at 1100° C. or greater for a time sufficient to char the material to create a charred material; collecting the charred material and milling the charred material in a ball mill to create a char powder having irregular polyhedron-shaped particles; classifying the char powder in a classification system comprising at least one 2-micron classification sieve, wherein char particles of less than 2 microns pass through the 2-micron classification sieve; collecting the less than 2 microns char particles passing through the 2-micron classification sieve and adding said less than 2 microns char particles to a master batch with at least one polymer.

In a further embodiment, a process for creating a master batch comprising a plurality of hemp char particles and at least one polymer comprising: carbonizing a portion of a hemp material in a furnace, said furnace being flushed with nitrogen and then heated to a temperature of greater than 1100° C.; wherein the temperature of greater than 1100° C. is held for at least 60 minutes; maintaining nitrogen flow over the at least 60 minutes to maintain a low oxygen environment to create a char; removing the char from the furnace and allowing it to cool; milling the char by a milling process for a period sufficient to reduce the char into a plurality of particles having an irregular polyhedron shape and an average particle size of less than 2 microns to create char particles of less than 2 microns; combining the char particles having an average particle size of less than 2 microns with the at least one polymer, wherein the ratio of char particles to polymer is between 10:90 and 50:50; and mixing the at least one polymer and the char particles to form the master batch.

In a further embodiment, the process wherein at least 90% of all of the char particles are less than 2 microns in size.

In a further embodiment, the process wherein the average particle size of all of the char particles is between 1 and 2 microns, and wherein at least 95% of all of the char particles are less than 2 microns in size.

In a further embodiment, the process wherein the milling process is a ball mill.

In a further embodiment, the process wherein the milling process is a wet milling process. In a further embodiment, the process wherein the wet milling process comprises a nonaqueous solvent.

In a further embodiment, the process wherein the char particles having an average size of less than 2 microns are classified to remove particles of more than 2 microns in size.

In a further embodiment, a process of forming a plurality of charred hemp particle having more than 50% of particles formed between 1 and 2 microns in size comprising: drying cut hemp stalk on a field for a period of less than 7 days; pyrolyzing the dried hemp stalk at a temperature of greater than 1100° C. to create a char; adding the char to a grinding vessel and grinding the char for a period of between 1 and 16 hours to form a ground char having particles having an irregular polyhedron shape; screening the ground char with a 2-micron screen to create a screened char of less than 2 microns; and capturing the screened char of less than 2 microns.

In a further embodiment, the process wherein the grinding vessel is a steel vessel with steel grinding balls.

In a further embodiment, the process wherein the grinding is dry grinding.

In a further embodiment, the process wherein the grinding is wet grinding. In a further embodiment, the process wherein the wet grinding is performed for a first duration of between 1 and 16 hours and is followed by a step of drying to create an agglomerated ground char and regrinding the agglomerated ground char in a dry grinding process.

In a further embodiment, the process further comprising separating the material resulting from the 2-micron screen into particles smaller than 2 microns and particles larger than 2 microns and regrinding the particles larger than 2 microns.

DETAILED DESCRIPTION OF THE INVENTION

Figure 1:
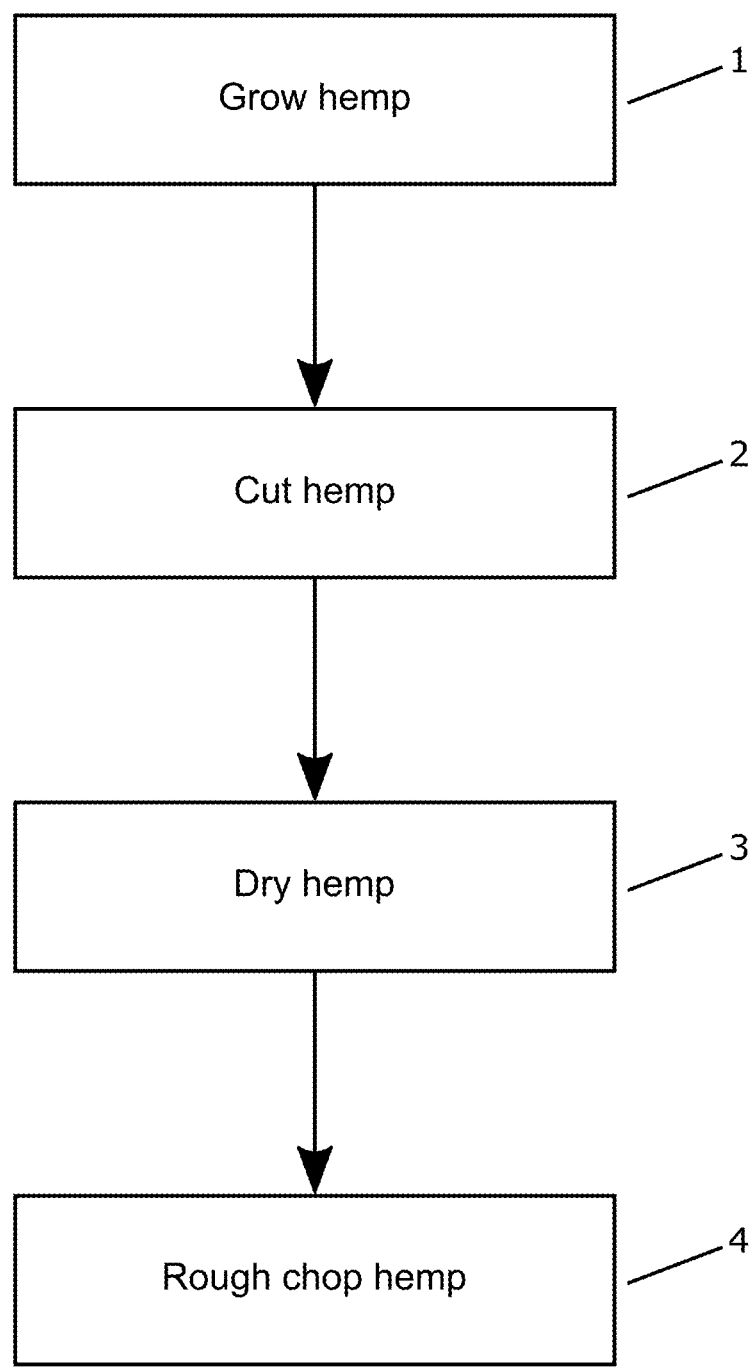
FIG. 1 depicts a flowchart of a process for cutting hemp from a field to prevent formation of substances.

Hemp has a long history of industrial use and was widely cultivated in the world for its rough use for the fiber portion of the plant. Hemp has many advantages over other agricultural crops, namely, the plant itself is resilient to weeds, it can be harvested 2-3 times a year and it does not need pesticides or herbicides to flourish. Its deep root system means that hemp plants need much less nitrogen (fertilizer) and water to flourish compared to other crops like cotton. Moreover, farmers can use hemp plants as an alternative to clear fields for other crops. The average hemp plant grows to a height of between six (6) feet to sixteen (16) feet and matures in approximately seventy (70) to one hundred ten (110) days, thus facilitating multiple harvest opportunities each year in many areas of the world. A hemp crop has the potential of yielding 3-8 tons of dry stalks per acre per harvest while remaining carbon negative.

Hemp, like many dicotyledonous plants, contains a phloem (hurd) and fibers (bast fibers) around the phloem. Inside the bast fiber is the hurd, a wood-like portion of the hemp plant, which surrounds a hollow core. In any given hemp plant, there is significantly more hurd biomass than of fibers. Unfortunately, the use of the hurd has been shunned to date, even though it is the primary biomass of the plant. Manipulation and use of the hurd, therefore, would serve as a critical step in use of this cellulosic product that would otherwise become waste.

Fibers have been frequently utilized individually, which requires that the fibers are separated from the hurd by mechanical (for example, decortication), or chemical properties, and the fibers can then be used for any fiber materials, including textiles like carpet, yarn, rope, netting, matting, and the like.

The singular use of fibers, however, leads to large amounts of waste byproduct, from the stalk and/or hurd and limits viability of the plant for widespread cultivation. The hurd, by contrast, is relatively difficult to use, and has previously only been used for rough processes such as papermaking, particleboards, concrete mixtures, and construction composites, as well as for animal bedding.

Widespread use of cannabis was dramatically reduced during the twentieth century due to the concern regarding the amounts of tetrahydro cannabinoids (THC) within the plants. However, there are a number of different strains/cultivars of the hemp plant that contain smaller and larger amounts of the psychoactive compound, THC, and thus cultivation can be optimized for the particular growth and THC content that is desired, including plants with low to zero THC. Here, a fast growth rate and a high total biomass is desired, although any biomass may be suitable for use. These traits may be naturally derived through strains and crossbreeding as known to those of ordinary skill in the art, or genetically modified.

Ultimately, hemp functions as a carbon negative plant, making it highly attractive for large scale use, especially where a downstream use can be identified. These features make hemp an intriguing option for cultivation, but the many difficulties with the plant have precluded its use on any scale up to this point. What is missing from the hemp ecosystem are processes and methods for consumption of the hemp material after its growth, wherein the fibrous materials of the plant can be utilized in commercially viable enterprises.

Therefore, in an effort to pursue sustainable and environmentally responsible bio-char material, suitable for use in a variety of master batch processes, and as a replacement for the more expensive and time/process intensive CNTs (carbon nanotubule) and graphenes in any number of commercial products, applicant has identified nanoparticle bio-char hemp-based materials and processes for generating the same.

Bio-char produced from the pyrolysis of cellulosic agricultural waste results in amorphous carbonized solids that exhibit similar electrical properties of CNTs. Herein, the methods, processes, and products utilize carbonized hemp as the cellulosic material to create carbonized materials having particle size of less than 50 microns to incorporate into materials, which can be utilized in master batches to generate spun fibers, spun or extruded fibers and films, composites, or through other postprocessing steps as known to those of ordinary skill in the art. In preferred embodiments the particle size is preferably less than 25 microns, preferably less than 20 microns, preferably less than 15 microns, preferably less than 10 microns, preferable between 5 and 10 microns, preferably between 2 and 7 microns, preferably between 2 and 5 microns, and most preferably below 2 microns. Once such material is generated, the micron-sized char can be utilized in any number of master batch protocols and postprocessing applications. Indeed, based upon the particular processing steps, the materials can modify be imparted into materials generated from a master batch, such as a composite material that generates improved mechanical/structural properties as well as generating materials having certain electrical and/or conductive properties.

Hemp serves as the raw material for generation of the hemp-based bio-char. In view of FIG. 1, a process is generally defined to grow hemp (1), cut hemp (2), dry hemp on (3), and rough chop the dried hemp (4). Several of these steps are further broken down into additional steps and processes in order to generate a nanoparticle sized bio-char having suitable properties for its downstream industrial use.

Growth of hemp (1) is predicated on simply growing biomass. Any of the various cultivars of the *Cannabis sativa* plant, and biowaste from hemp growth can be utilized. In this manner, we can capture biomass from other industries that are interested in processing seeds or leafy greens and utilize both the fibers and hurd from the stalk. Indeed, herein, processes are described that can utilize both the fibers and hurd in higher value applications than the prior uses. The processes herein describe that it is preferential to utilize both the fiber and the hurd together, in order to generate a superior char material. Heretofore, hemp fibers were typically separated from the hemp hurd, and the fibers used for certain materials and the hurd and remaining biomass utilized in low value applications, such as concrete fillers, animal bedding, and other applications, including simply being composted or burned as waste. However, the combined processing reduces waste and utilizes the fibers and hurd together an a more efficient and valuable process.

Cutting of the hemp (2) simply takes the growing hemp and cuts at the base of the stalk or removes the hemp from the ground to begin the drying process. Once the hemp is cut, the drying process begins (3) almost immediately, however, moisture is an enemy to the drying process. Accordingly, it may be suitable to cut the hemp (2) and allow them to dry on the field for 0-7 days, then collecting them and finalizing the drying process in a controlled environment. This can simply be within a greenhouse or warehousing space so that the material is not subjected to rain or other moisture to facilitate drying and to prevent formation of mold, rot, or other fungal growth.

Furthermore, as the hemp dries and the longer the hemp stalks remain on the field the longer time, they have to undergo retting. The retting process allows the hurd and fiber to naturally separate. However, as the hurd and fiber separate, the stalks become sticky with resin, and this process makes it difficult, if not impossible to utilize the material in a continuous feed bio-char system, necessary for high throughput. Accordingly, the hemp material is preferably utilized within a specific window after harvest to prevent the retting and resin formation. This sticky resin material, once formed, reduces the ability to efficiently char the hemp, and further reduces the yield of milled char that is generated under 2 microns in size.

Therefore, to process the hemp most efficiently, it needs to be preprocessed properly. Accordingly, a proper drying process is necessary to ensure that the materials can be utilized in certain processing systems. Thus, the preferred step is where the stalks should not lay in a cut state on the ground for more than a week. To do this properly, weather reporting and management of the cut material is necessary to prevent spoilage. In a preferred embodiment, the stalk would be cut and dried in a controlled environment and pyrolyzed, before retting takes place. When retting does occur, the fiber and hurd may need to be separated to allow for processing. This increases cost and time for processing and thus reduces sustainability. Furthermore, conductivity is greater with the fiber and hurd pyrolyzed together, than when the fiber or hurd are pyrolyzed separately, as seen in Table 2, and thus the singular processing of hemp stalk is important where conductivity is desired in the char product.

Figure 7:
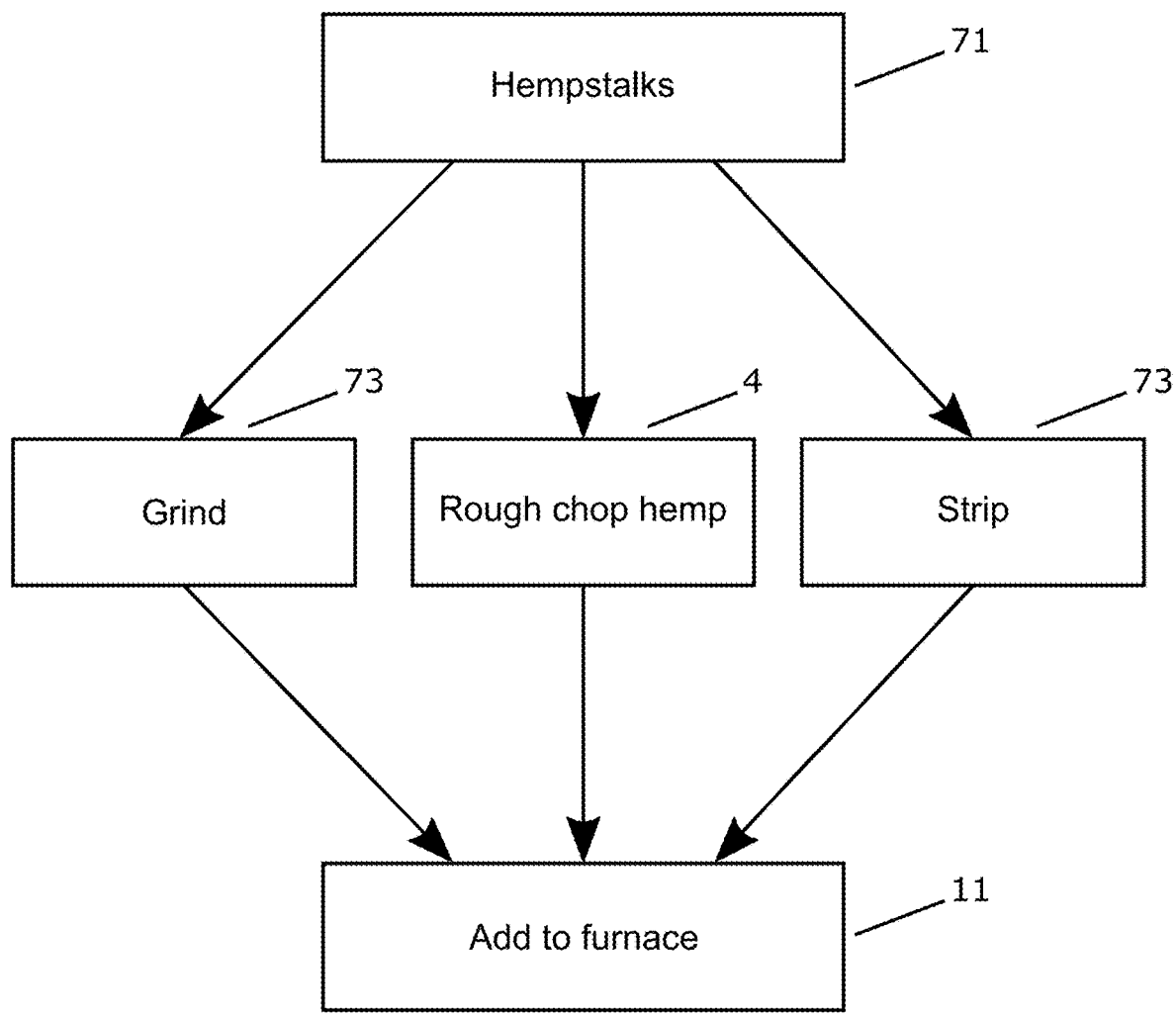
FIG. 7 depicts a flowchart for processing hemp.

Processing or rough chopping 4 of the hemp may include one or more steps. In the simplest form, the dried hemp (3) is simply collected, and placed into a furnace for carbonization. In other steps, for example, as in FIG. 7, the processing takes hemp stalks (71) and either rough chops (4), grinds (72), or strips (73) the stalks, or both grinding (72) and stripping (73) before adding the material to a furnace (11). This provides a simple process to achieve material having an appropriate size to be charred in a furnace and achieve an even charred material. The charring process is to generate a carbon bio-char material, which can be further milled, or ground as detailed in additional figures, including FIGS. 2A, 2B, 3, 5A, and 5B.

Existing char is most commonly produced from coconut shell, peat, hard and soft wood, lignite coal, bituminous coal, olive pits and various carbonaceous specialty materials. In many industrial uses, char is activated via chemical or steam processing. Activating char typically results is a highly porous adsorptive medium that has a complex structure composed primarily of carbon atoms. These materials are often used in large particle size for their absorptive properties. This is due to the fact that the networks of pores in activated carbons are channels created within a rigid skeleton of disordered layers of carbon atoms, linked together by chemical bonds, stacked unevenly, creating a highly porous structure of nooks, crannies, cracks and crevices between the carbon layers, allowing for high binding of certain additional molecules.

However, the rough and large particle size materials are inconsistent with their use in master batches, for example to be combined with polymers for creation of fibers or for other applications that require nanoparticles having nanosized particles within a mixture that are a substantially homogeneous size. However, processing of the material into a size of less than 10, 5, and/or 2 microns, and wherein a mixture of particles have a specific classification size is difficult to achieve and not achieved before the processes described in embodiments herein.

Process for Generating Micron Particles of Hemp Having a Precise Size Variance

While certain cellulosic materials are both easily carbonized and then reduced to a millimeter particle size, reduction to micron size was fraught with great difficulty with hemp. First, the micron-sized particle is generated by the processes described herein, specifically towards a particle size of less than 10, less than 5, and less than 2 microns in size generates unique considerations. Second, the low density of the material combined with the small size necessary for creating highly valuable materials renders the milling and classification process to be extremely difficult. As detailed in Table 1, the density of hemp is dramatically less than typical char products, which impacts the ability to mill and classify the resulting material. Several processes were tried that resulted in varying levels of success with regard to consistency and also to yield. The end product must both meet a minimum particle size, but also be precise with respect to average size within the total particles within the mixture. Accordingly, we describe this a specific classification size, i.e. one that has all particles with a precise size (within an acceptable tolerance), or sometimes also referred to as substantially homogeneous in size.

TABLE 1

Density of certain materials

| Species | Density of Dry Wood (lb/ft$^3$) | Weight of dry cord (lb) | Recoverable heat value of Cord (millions of BTU) |
| --- | --- | --- | --- |
| Aspen | 27 | 2290 | 10.29 |
| Cherry | 36.7 | 3121 | 14 |
| Hickory | 50.9 | 4327 | 19.39 |
| Red Oak | 44.2 | 3757 | 16.8 |
| Hemp | 8.74 | 741 | 3.33 |

In preferred embodiments, the process utilizes hemp stalk, however, a wide range of hemp materials including: full hemp stalks, chopped full hemp stalks, chipped full hemp stalk, full hurd, chopped hurd, chipped hurd, ground hurd, separated hurd and fiber, chopped separated hurd and fiber, chipped separated hurd and fiber, ground separated hurd and ground separated fiber may be utilized for certain applications. As detailed below, and in Table 2, the combination of the hurd and fibers provides a superior material for electrical properties.

Pyrolysis

Figure 2A:
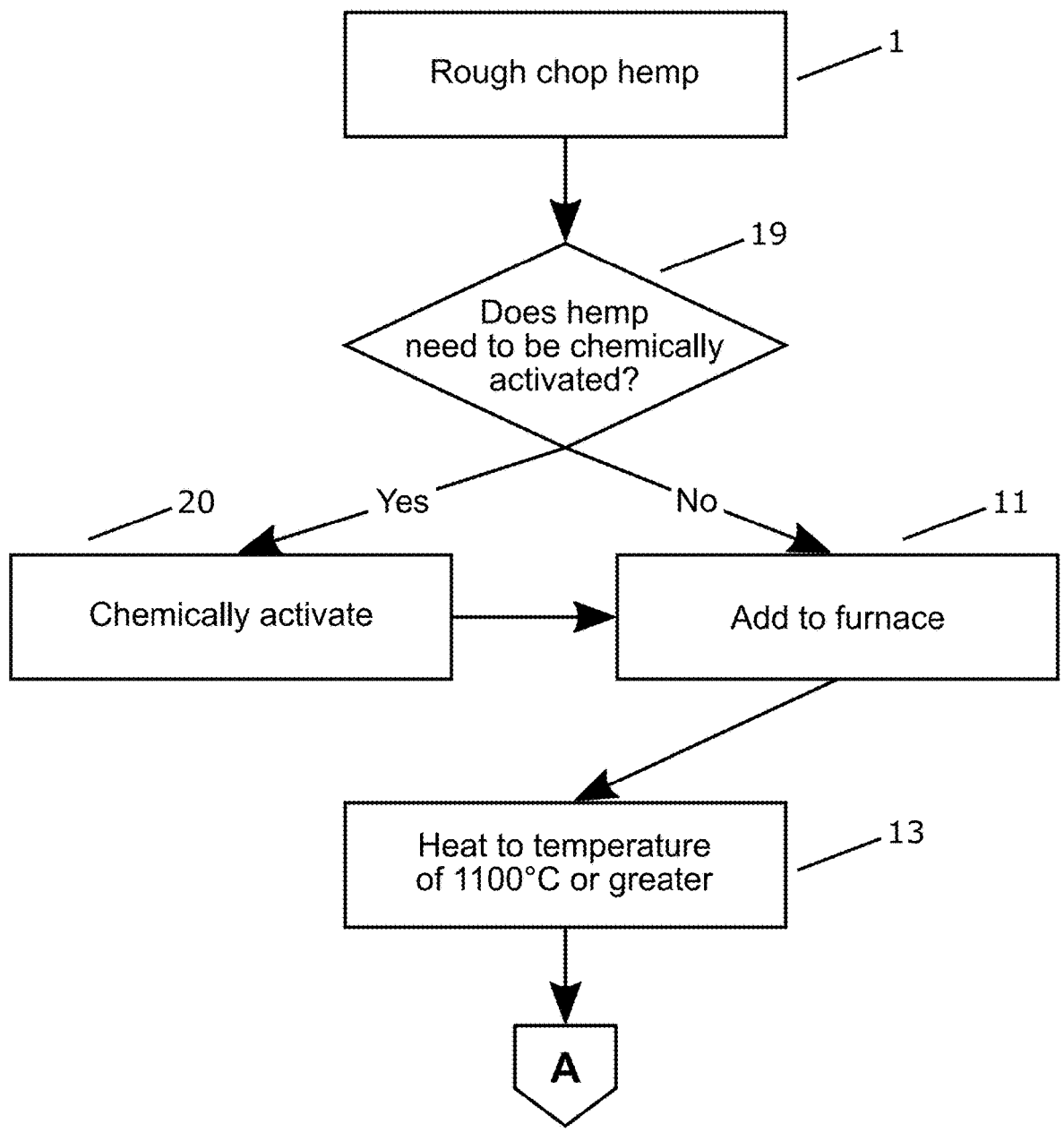
FIGS. 2A and 2B depict a flowchart of a charring and classification process for hemp.

When performing pyrolysis, bio-charring temperatures at preferably between about 600° C. to about 1500° C. and can be performed via batch or continuous flow processes. As seen in FIG. 2A, rough chopped hemp (4) is added to a furnace (11) and then heated to more than 1100° C. (13). An intermediary question is whether the hemp needs to be chemically activated (19), and if yes, then it is chemically activated (20) and then added to the furnace (11). In particular, the heating process is done at low oxygen percentages, this is to prevent the complete combustion of the material, as known to those of ordinary skill in the art. Accordingly, the chamber is filled with one or more inert gasses during the char process. While a temperature of at least 600° C. is sufficient to char the material, it leads to uneven burn of the material and uneven charring. More importantly, processing at the low end of the temperature scale leads to low amounts of conductivity on its own.

Furthermore, in subsequent processing of the material into nanoparticle sizes, the inconsistent char makes it impossible to effectively grind to a substantially homogeneous particle size with any reasonable yield. Pyrolysis from about 1100° C. to about 1500° C. not only produces an evenly charred material, but also produces a material with higher conductivity than if processed at a lower temperature. Thus, when processing above 600° C. but below about 1100° C. (51), FIG. 5A details one possible method, wherein it is necessary to further activate the carbon in order to modify the cellular structure through an activation step, which is typically steam activation (14) or chemical activation (20). This activation step is not as efficient as high temperature pyrolysis.

The process herein is unique in several ways. First, as defined in FIG. 2A, the activation process is preferably carried out at 1100° C. or greater (13) in low oxygen conditions. Most bio-charring (charcoal formation) is not carried out at such high temperatures. Furthermore, the physical characteristics of the hemp plant make the subsequent processing of micron-sized particles exceedingly difficult at any suitable yield, as detailed in Table 1, which shows that hemp is a much lower density than other common cellulosic materials used for making char in that the lightweight and low-density nature of hemp makes it more difficult to process into a uniform and small particle size necessary for its use in certain materials described herein. In particular, the particle size as well as the particle shape are important.

Interestingly, the carbon utilized in these processes and in, for example, downstream manufacturing processes are advantageous when they have a three-dimensional shape instead of the typical flat carbon materials. Typical carbon materials are long and flat, and while they have a minimal three-dimensional characteristic, the length and/or width are typically 100 to 10,000 times the height (think of graphene). When such particles are compressed, they are not regularly ordered and so some particles are oriented vertically, others horizontally, and yet others in every odd direction. Because of the great difference in the particle shape, this yields very fine irregularities in the products.

In comparison to the typical long and flat particles, the process herein creates particles that are more consistent in dimensions between the length, width, and height, which are an irregular polyhedron shape. This results in an irregular polyhedron particle that, while not having an organized shape, has a dimension in each of the three (3) axes (x, y, z) that is closer in size than the typical graphene particle. Thus, where a flat carbon (graphene) of the prior art would have (by example only) a length of 5 microns, a width of 5 microns, and a height of 0.01 micron, for example, the claimed carbon would not have the same discrepancy with regard to differences between the longest and shortest axes. An example particle could have a length of 1.5 microns, a width of 1.0 microns, and a height of 0.4 microns, with many facets. Accordingly, this shape is an irregular polyhedron, and the particles formed are irregular polyhedron particles.

Figure 8B:
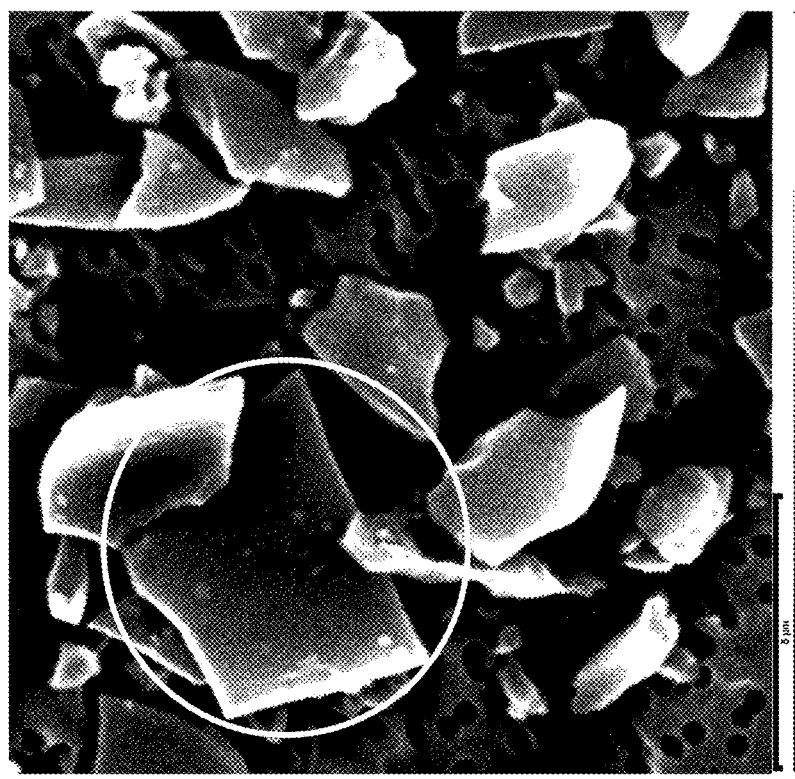
FIGS. 8A and 8B depict images of carbon made in an irregular polyhedron shape for most effective use, labelled as "3D carbon" in the figure.
Figure 8A:
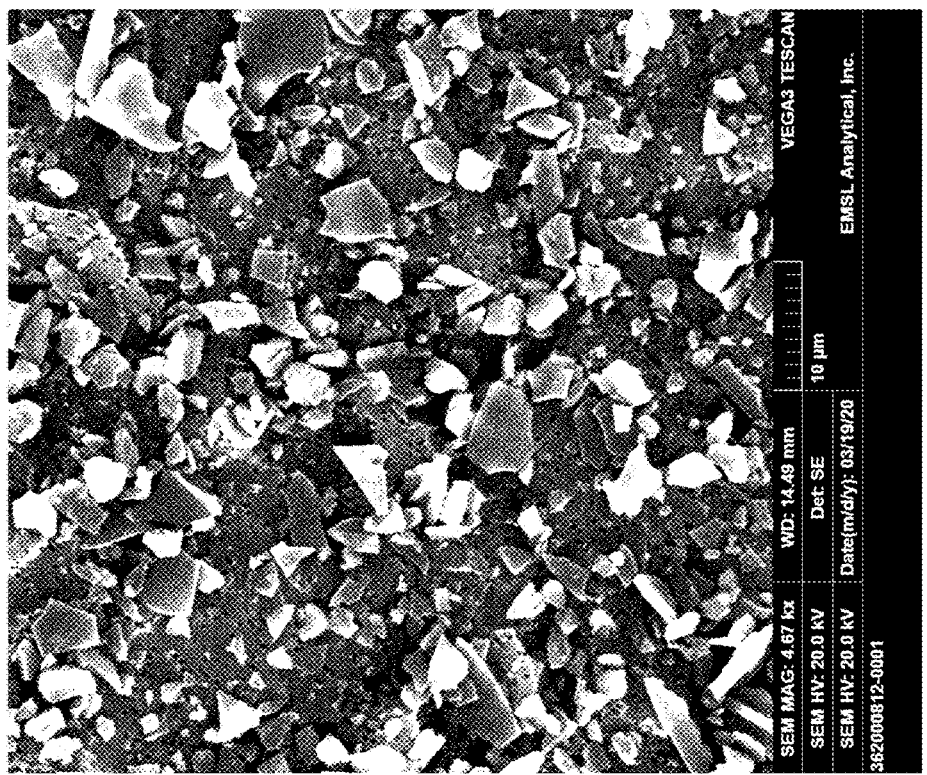
Figure 8D:
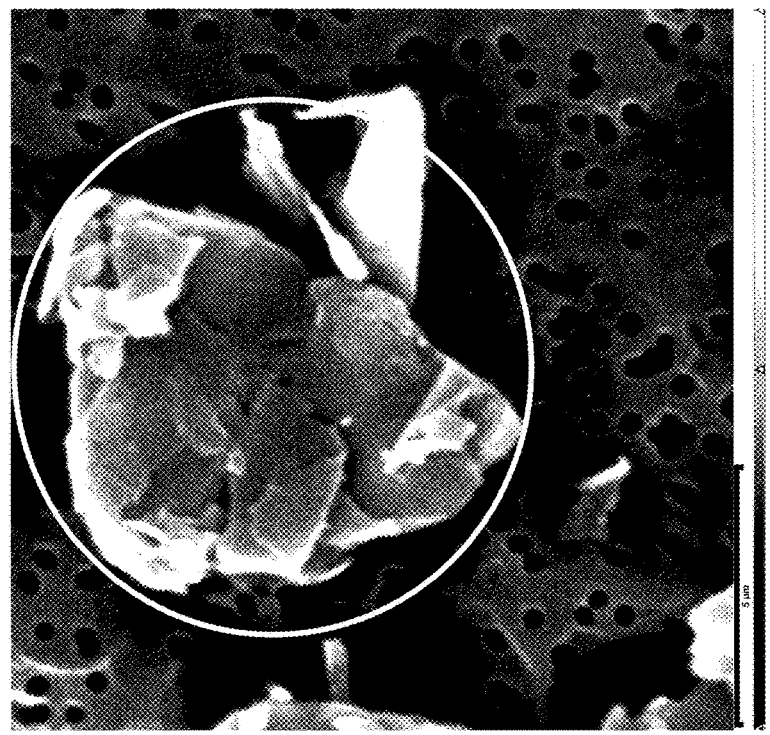
FIGS. 8C and 8D depict images of "flat carbon" particles found in prior art.
Figure 8C:
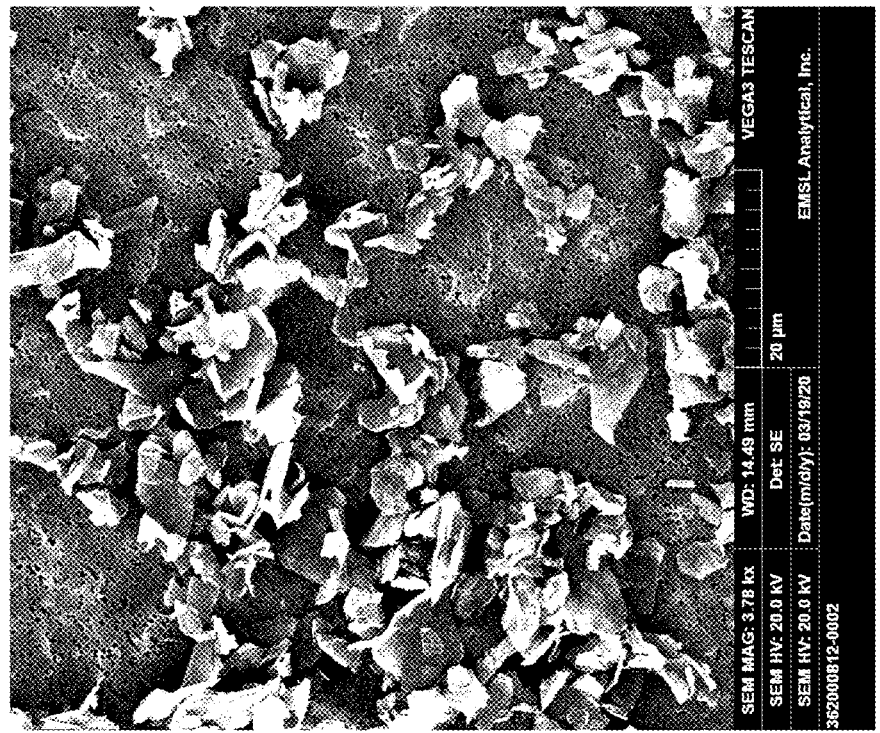

FIGS. 8A and 8B depict images of the irregular polyhedron particles, labelled as "3D carbon," while FIGS. 8C and 8D depict images of "flat carbon" graphene. Notably, the irregular polyhedron carbon is of smaller size, is more consistent in the size in relation to the other particles, and is less flaky (i.e., the material is not as long and thin) as the prior art carbon. The hemp-based material thus has a narrower bell curve and the particles themselves are more consistent in their size ratio between the major axis (the longest length) and the minor axis (the shortest length) for each particle on average as compared to the prior art. This feature is significantly important to ensure the tightest tolerances when using the irregular polyhedron shaped particles in downstream processes, such as in the manufacture of fibers.

Steam Activation

Figure 5A:
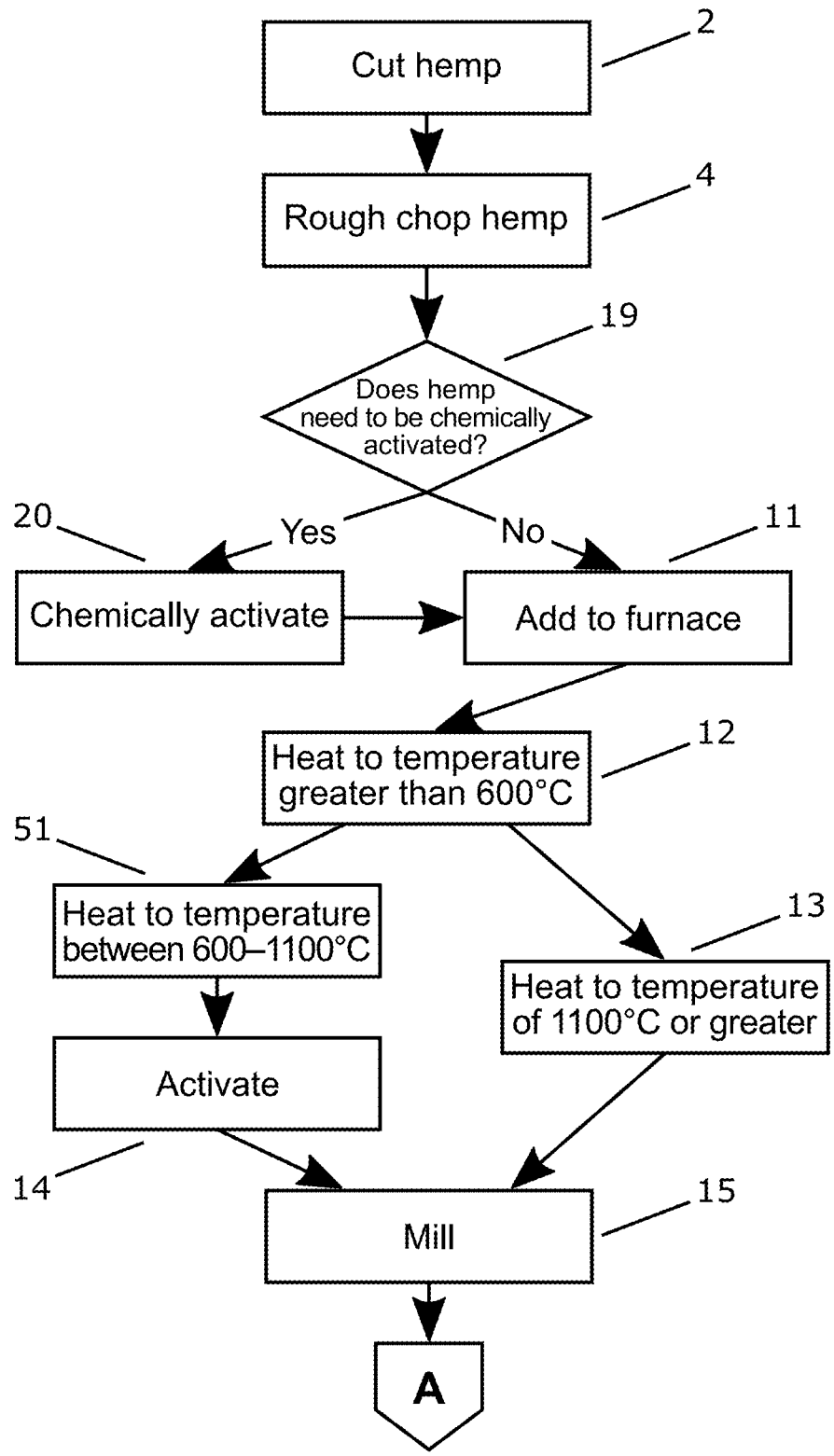
FIGS. 5A and 5B jointly depict an expanded flowchart of a process for creating fractions of nanoparticle hemp.

While temperatures above 1100° C. are preferred, it may be optimal to char at lower temperatures in some embodiments and activate the char. This process may include chemical activation or steam activation, though steam activation, if any activation is performed, is preferred. As depicted in FIG. 5A, when heating to a temperature of greater than 600° C., but between 600° C. and 1100° C., we need to activate (14) the material. The activation stage of the char enlarges the pore structure, increases the internal surface area, and makes it more accessible. During steam activation, the carbonized product is activated with steam at a temperature between 600° C. and 1200° C. The chemical reaction between the carbon and steam takes place at the internal surface of the carbon, removing carbon from the pore walls and thereby enlarging the pores. The steam activation process allows the pore size to be readily altered and carbons can be produced to suit specific end uses.

Chemical Activation

As opposed to steam activation, chemical activation involves the processing of and mixing raw material with an activating agent, to swell the char and open up the cellulose structure before pyrolysis. Preferred chemical activation agents include an acid, base, or salt, such as formic acid, acetic acid, propionic acid, succinic acid, oxalic acid, lactic acid, malic acid, benzoic acid, phosphoric acid, nitric acid, hydrochloric acid, hydroiodic acid, nitric acid, sulfuric acid, perchloric acid, bases, such as sodium hydroxide, barium hydroxide, strontium hydroxide, and other sales such as calcium chloride, zinc chloride and others as known to those of ordinary skill in the art. Accordingly, the process inquires if chemical activation is necessary (19), and if yes (20), then an activation chemical is added. Once the raw material is impregnated with the chemical, the impregnated material is carbonized by adding to a furnace (11), often at the lower end of the temperature scale, 600°-900° C., to yield activated carbon. On carbonization, the chemical acts as a support and does not allow the char produced to shrink. It dehydrates the raw material resulting in the charring and amortization of the carbon, creating a porous structure and an extended surface area.

Activity is controlled by altering the proportions of raw material to reagent used. Activity increases with higher reagent concentration and is also affected by the temperature and cook time.

Accordingly, as defined in FIGS. 2A and 5A, a decision tree at the heating/activation point is necessary (19). If heating to above 1100° C. (13) then no activation is necessary. If heating to less than 1100° C., a decision about the activation process is necessary, with an initial chemical loading step (20) necessary before charring, and a steam activation step (14) (FIG. 5A) is necessary if no chemical activation is completed. In each case, once a temperature is determined, the material is placed in a low oxygen environment and temperature steadily increased and held for a sufficient amount of time to char the material. Typically, this is 2-12 hours.

When activating, high temperature activation is preferred, with steam activation and chemical activation as other preferred embodiments. High temperature activation is the most sustainable, but each are sufficient to open the surface area of the char, which improves moisture management, antistatic, friction, and aesthetic characteristics. Indeed, when the material is processed, one gram of carbon results in 32,000 square feet of surface area.

Accordingly, the process of pyrolyzing and activating the hemp material is important for imparting certain physical properties to the material. This is optimized by processing hurd and fibers together, at a temperature of above 1100° C. or higher, which yields improved electrical or conductive properties as depicted in Table 2, below. Indeed, while it is commonly known that charcoal is a poor conductor of heat (e.g., walking on coals) and electricity, Applicant has generated a process and material that is of a substantially homogeneous size and structure that conductive and electrical properties are generated through irregular polyhedron-shaped particles. Indeed, it is these small sizes and structure that are able to suitably generate and carry certain electrical charges under certain circumstances.

Table 2 shows a summary of electrical properties. Applicant tested the ability to transmit a charge through a material comprising 20% carbonized hemp material. The carbonized hemp material and temperature of char was varied to determine an optimal process for manufacture, as detailed in the results in Table 2. In sum, a combined hurd and fiber material, charred at greater 1100° C. or greater showed improved results as compared to those of fiber or hurd alone or charred at below 1100° C.

TABLE 2

Comparison of Materials for Electrical Properties

| Material | Temperature of Furnace (° C.) | Electrical Property |
| --- | --- | --- |
| Hurd | 600 | Weak |
| Hurd | 900 | Weak |
| Hurd | 1100 | Weak |
| Fiber | 600 | Weak |
| Fiber | 1100 | Weak |
| Combined Hurd/Fiber | 600 | Weak |
| Combined Hurd/Fiber | 900 | Weak |
| Combined Hurd/Fiber | 1100 | Best |
| Combined Hurd/Fiber | 1200 | Same as 1100° C. |

Therefore, in bio-charring hemp materials, the hemp material is heated in an inert (low oxygen conditions, typically through addition of another gas) atmosphere so that dehydration and devolatilization of the carbon occur. Optimization of this process utilizes a combination of hurd and fiber at a temperature of more than 1100° C. Carbonization of the hemp then reduces the volatile content of the source material to under 20% and yields a coke. The coke is then further manipulated by milling the material before it can be used with polymeric substrates in downstream master batches.

Because of the brittle nature of the carbonized material, it can be directly milled (15) into fine powders having particle sizes in the micron dimensions for suitable use as an irregular polyhedron particle in composite materials. For example, milling (15) by placing the carbonized material into a mill, will result in rapid reduction of particle size into an irregular polyhedron particle powder of having a particle size of less than 2 microns in the largest axis of the irregular polyhedron particles.

Milling

Figure 2B:
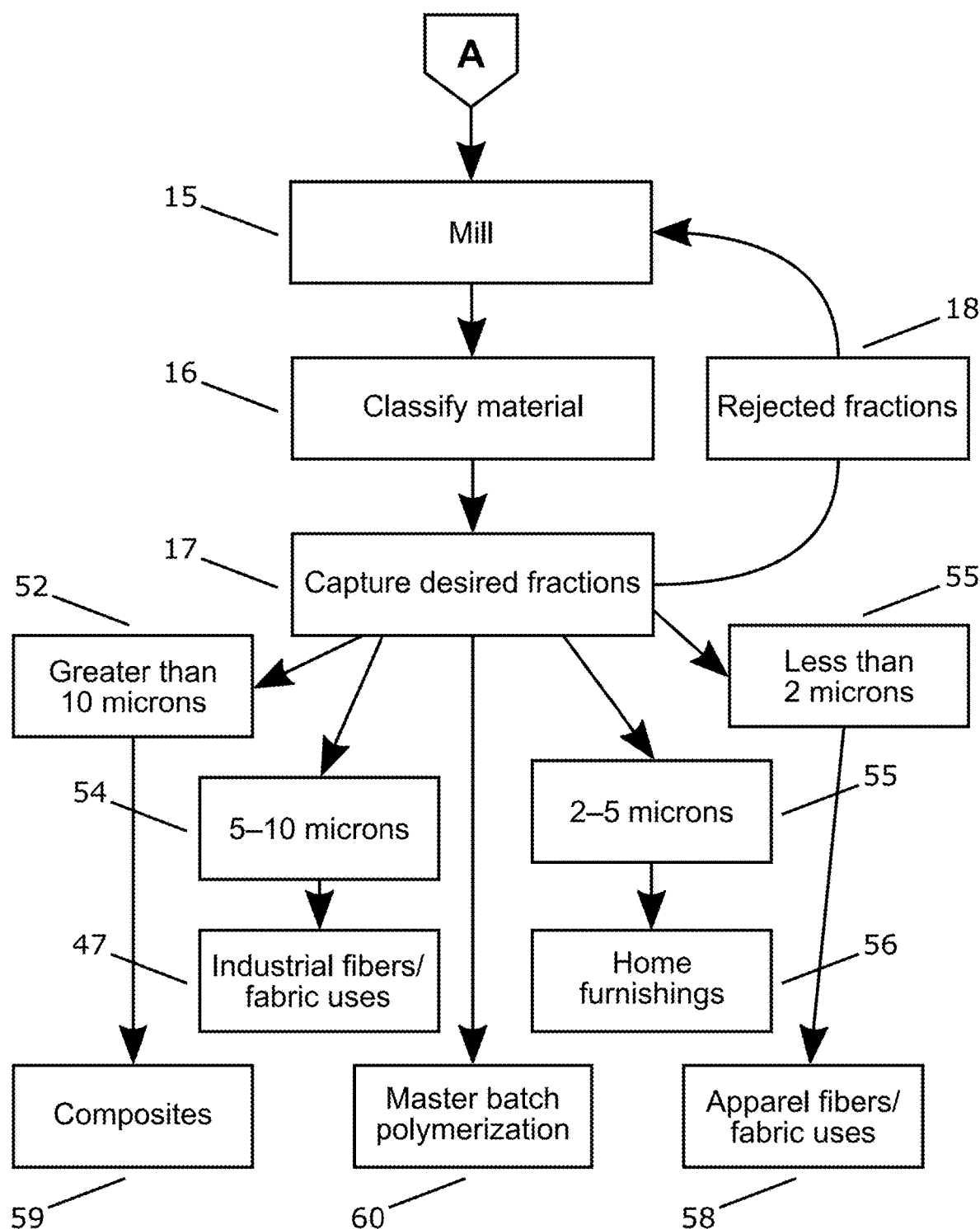

Continuing with FIGS. 2A and 2B, after heating to a temperature of greater than 1100° C., the process continues in FIG. 2B to milling (15). Milling or grinding of the material to a specific classification size creates a better product with greater uses than products that do not have a specific classification size. In certain embodiments, the distribution of particle sizes within a range may also be defined by an arithmetic mean, arithmetic mode, etc. As used herein, the term "specific classification size" refers to a percentage of particles within a certain given point as compared to the classification size. For example, a specific classification size of 2-5 microns, means that at least 90% of all particles are between 2 and 5 microns. The micron size refers to the length of the largest axis, i.e., within the x-, y-, and z-axes of the irregular polyhedron particles. More preferably, a 95% specific classification size, a 99%, or a greater than 99% specific classification size means that 95%, 99%, or more than 99% of particles are between 2 and 5 microns in size, respectively.

Furthermore, the specific classification size can be further narrowed by defining a specific micron size and bell curve. For example, a 99% specific classification size of 2-5 microns and a 95% 3.5-micron bell curve means 99% of particles are within 2-5 microns and that 95% of all particles are within 2 standard deviations from 3.5 microns. This is intended to make sure that the irregular polyhedron particles are precise with regard to their size within a plurality of particles, with a goal that size is homogeneous among all particles. The bell curve may be a 50%, 75%, 90%, 95%, 99%, or more than 99% bell curve. In essence, a tighter bell curve gives a particle size that is more homogeneous in size. Having something be more homogeneous leads to a better resulting product, especially for irregular polyhedron particles of less than 5 microns and certainly of less than 2 microns in size. In a preferred embodiment, the irregular polyhedron particles have a 90% specific classification size of less than 2 microns, with a 90% bell curve at 1, 1.25, or 1.5 microns. This results in a 90% specific classification size of less than 2 microns, a 90% bell curve at 1.5 microns, and results in an average mean particle size of between 1 and 2 microns.

The classification process, e.g., in FIGS. 2A, 2B, 3, 4, 5A, and 5B proved especially difficult at a suitable yield and to generate the specific classification size of less than 2 microns suitable for use in certain downstream processes. To form a material with 90% of particles smaller than 2 microns, with the average mean particle size between 1-2 microns, a screening or classification process is utilized to remove particles greater than 2 microns after the material is milled. For example, as detailed in FIG. 2B, the milling step (15) is followed by a classification step (16), and wherein desired fractions (17) are captured, and any rejected fractions (18) are remilled to achieve smaller particle sized.

Figure 3:
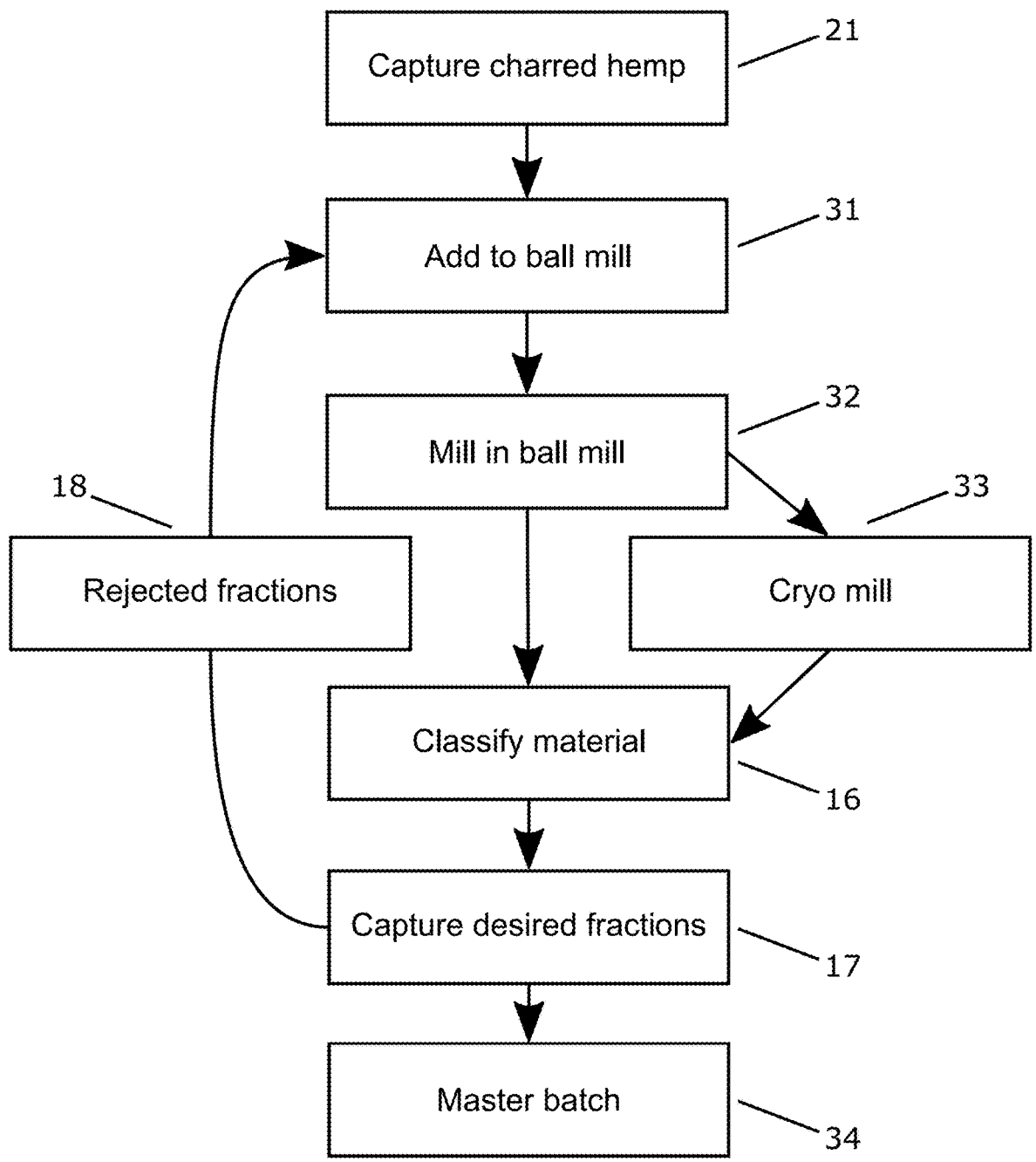
FIG. 3 depicts a flowchart of a milling process for char.

To generate the suitable fractions and to form suitable sized particles, the process preferably utilizes a ball mill, with the possible addition of one additional step. Ball mills add material to a container and include one or more balls within the container, which is then oscillated to shake the balls and material together. This process crushes the material from its brittle state into the irregular polyhedron particles. FIG. 3 details an embodiment of a milling process, which, begins by capturing charred hemp (21), which is then added to a ball mill (31). The charred hemp is ground or milled in the ball mill (32). The material is then classified (16), desired fractions are captured (17), and rejected fractions (18) are readded to the ball mill (31) to go through the process again. The desired fractions are added to master batches (34) for downstream processing.

In certain embodiments, it is suitable to cryo mill (33) the charred hemp. Cryo milling involves milling the material under liquid nitrogen or other material, typically at a temperature of less than −100° C. By reducing the temperature of the material, we lower the charred hemp below a point to which the material has become brittle, thereby milling at this temperature increases the fracture of the charred hemp into nanoparticles for our applications, especially those below 10, below 5, and below 2 microns in size. The cryo milling process can be excluded, replace normal milling, or be completed in addition to regular milling.

Finally, the particles are sorted by size. Accordingly, in FIG. 2B, the material is milled (15), and then classified (16). The classification process then separates the material into suitable fractions and the desired fractions are captured (17). Rejected fractions (18) are added back to the mill (15) to remill then to a smaller size. Preferred captured fractions include less than 2 microns (55), for use in apparel/fibers and fabric uses (58). Additional fractions between 2-5 microns (53) can be used for, e.g., home furnishings (56). For fractions between 5-10 microns (54) can be utilized for industrial fibers/fabric uses (47). For fractions greater than 10 microns (52), an exemplar use is with certain composites (59). These fractions are advantageously added to master batch polymerization (60) for such downstream uses as appropriate.

Figure 4:
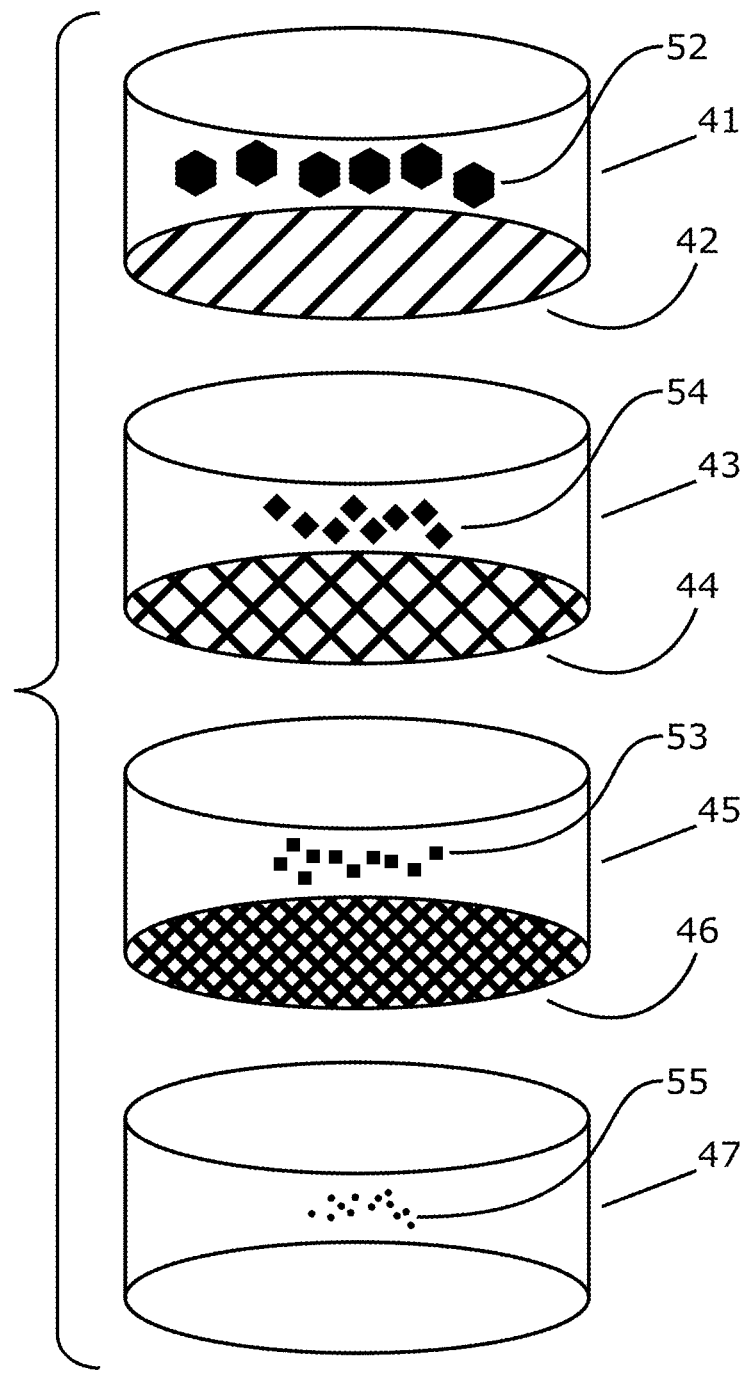
FIG. 4 depicts an exemplar classification system.

An example of a classification sieve set is defined by FIG. 4, a first classification container (41), with a first classification screen (42) captures a first material (52), a second classification container (43), and a second classification screen (44), captures a second material (54) a third classification container (45), and a third classification screen (46), captures a third material (53), and finally a fourth container (47), that captures any material (55) that falls through the third classification screen (46).

As an example, the first classification screen is 10 microns, the second classification screen is 5 microns, and the third classification screen is 2 microns. By adding the charred and milled hemp to the first container (41), any material (52) greater than 10 microns will be captured in the first container (41). This allows material (54) smaller than 10 microns and larger than 5 microns to be captured in the second container (43). Material (53) smaller than 5 microns and larger than 2 microns is captured in container (45), and finally all the material (55) smaller than 2 microns passes through the third classification screen (46) and into the fourth container (47).

Yield for the 2-micron size can be optimized based on the time of the milling process. Optimized yield is at least 50% of the material at less than 2 microns in size. For example, starting with 10 kg of char, would yield at least 5 kg of material of less than 2 microns in size. A yield of this amount was surprisingly difficult to achieve, as is detailed in the following experiments.

In preferred embodiments, the preferred particle size is 2 microns. Creation of irregular polyhedron particles at this size is optimized for creating improved fibers suitable for use in nearly all applications. However, reaching this size with the irregular polyhedron particle shape was very difficult. Formation of less than 2-micron-sized irregular polyhedron particles can be achieved by manual grinding of material with a mortar and pestle. However, use of this system is impracticable for commercial applications. Even so, such process leads to wide ranges of particle sizes that need to be screened to obtain the useable material at the 2-micron size.

In order to move to commercial applications, milling may include any of grinding, such as air jet grinders, wet processors, small batch high energy ball grinders, dry agitated media mills, pressure grinding, and other grinding and milling processes as known to one of ordinary skill in the art. Such grinders may rotate at a given RPM or oscillate at a particular frequency (Hz). The grinding process included times from about 1 hour to about 16 hours, with all times in between. Commercial attempts at grinding to 2 microns were suggested to be easily obtainable, yet actual processing to this size within acceptable tolerances (precision) and yields proved difficult.

Figure 5B:
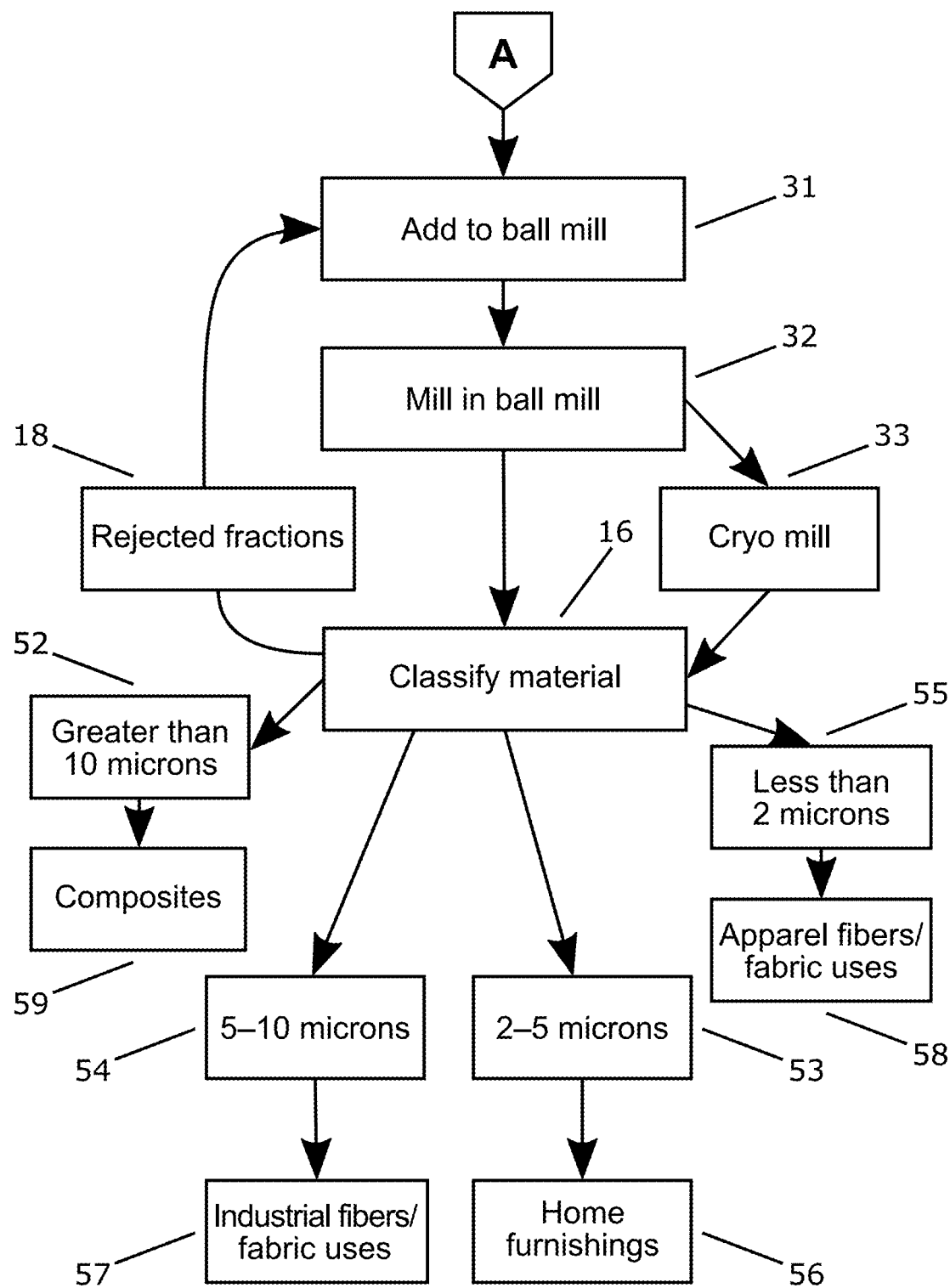

Thus, a preferred embodiment follows the process according to FIGS. 2A and 2B, or FIGS. 5A and 5B. For example, FIGS. 5A and 5B detail cut hemp (2), which is dried (see FIG. 1) and rough chopped (4). The rough chopped hemp (4) is determined to need chemical activation or not, with yes then chemically activating (20) the material, and no, adding it straight to the furnace (11). Where the temperature is heated to greater than 600° C. (12), and preferably greater than 1100° C. (13). If the temperature is between 600° C. and 1100° C., then the product must be activated (14), either chemically, as above (20), or steam activated (14), as described herein. Then the material can be milled (15). FIG. 5B then details adding the material to a ball mill (31), milling for a sufficient time in a ball mill (32), and classifying the material (16) after milling within the ball mill. Classified material is either rejected fractions (18), greater than 10 microns (52), 5-10 microns (54), 2-5 microns (53), or less than 2 microns (55). Exemplar uses of such material are defined as composites (59), industrial fibers/fabric uses (57), home furnishings (56), or apparel fibers/fabric use (58). This is determined based on the possible denier size of a fiber, which directly corresponds to the micron size of the char, and the formation of the less than 2-micron-sized char (55) for the apparel fibers/fabric use (58) being a primary end point for the bio-char.

A primary issue in generating the irregular polyhedron shaped particles of substantially homogeneous particle size is that hemp carbon has a lighter bulk density than other cellulosic carbon materials, so in dry grinding, the carbon floats around in the dry grinding mills, making it difficult to actually grind the material. Accordingly, several different processes and methods were tested to optimize the milling and classification process in order to generate suitable yields of the less than 2-micron-sized material.

EXPERIMENT 1: HAND MILLING WITH MORTAR AND PESTLE 10 grams of carbonized hemp made from hemp stalk (hurd and fiber) material was placed into a mortar and hand ground with a pestle. Grinding was performed for approximately 3 minutes, and the material was turned from small lumps into a fine powder. The powder material was then reviewed under a microscope for size. While a large portion of material was sufficiently ground to small sizes, there were significant amounts of material at larger sizes, due to incomplete processing. To quantify the amount of material below 2 microns, a 2-micron screen was utilized and approximately 45% of the material was below 2 microns.

The material larger than 2 microns was then reground for an additional 3 minutes and rescreened. An additional portion of material was generated below 2 microns. This process was repeated several times, with an average of 6.5 grams of material being less than 2 microns after two grindings, and a total yield of about 80%, meaning that about 20% of material was lost or not ground below 2 microns in the hand process, due to spilling, aeration of the particles through the screening and transfer processes, etc.

EXPERIMENT 2: DRY MILLING WITHOUT CLASSIFICATION

Experimental grinding included dry grinding in agar jars, with 3 mm agar balls. This provided a grind wherein about 50% of the char material was ground below 2 microns. Timing for grinding in this application typically was between 3 and 7 hours, with almost no difference in the resulting particle size when increasing from 3 to 7 hours. Furthermore, moving to steel jars and balls also resulted in similar processing. About 50% of the material is greater than 2 microns, and of the 50% larger than 2 microns, the size varied all the way up to 100 microns in size, and so it was determined that this process alone, was insufficient to generate a material of uniform material of less than 2 microns in size and also met any precision tolerances for use in a master batch.

Among four tests, three used agar jars, with a total amount of material below 2 microns at 47%, 51% and 52%, and the steel jar at 49%.

EXPERIMENT 3: DRY MILLING WITH SINGLE STEP CLASSIFICATION

As Experiment 2, above, failed to generate a material having high uniformity of size, a classification step was added to aid in sorting material by size. Experimental grinding included dry grinding in agar jars, with 3 mm agar balls. This provided a grind wherein about 50% of the char material was ground below 2 microns as in Experiment 2. Timing for grinding in this application typically was between 3 and 7 hours, with almost no difference in the resulting particle size when increasing from 3 to 7 hours. Milling at 3 hours, 5 hours and 7 hours, each resulted amounts of material at about 50% of the total below 2 microns in size. Starting with a process that generated 50% of the material below 2 microns allowed use of a screening or classification system to collect the 2-micron and below material, and the remaining 50% of larger material above 2 microns is remilled in a subsequent processing. This process is repeated until a sufficient quantity of 2 microns or smaller material is produced. When screening at such small sizes, some material of larger size may pass through the screens, but about 70%, 80%, 90% of the material, and preferably 95%, and most preferably 99% of the material is 2 microns or smaller, to achieve a mixture of particles with high precision and specific classification size and bell curve. For example, a 99% specific classification size of less than 2 microns and a 95% 1.5-micron bell curve means that 95% of all particles are within 2 standard deviations from 1.5 microns was achieved, with a yield of about 50%, with yields increasing after remilling material. This process is optimized for use when a nonaqueous solvent is not suitable for use with the master batch.

EXPERIMENT 4: DRY MILLING WITH MULTISTEP CLASSIFICATION

The process of Experiment 3 was repeated, but instead of a single 2-micron screen, a three-screen process, e.g. as depicted in FIG. 4 was utilized. The multiscreen process allowed for capture of additional fractions, but there is a small loss of yield, due to some of the material being trapped in larger screens and other losses. This loss was less than 2%, and so no additional process was used to push material through the screens, e.g. compressed air, or vacuum. A shaking system was utilized to gently coerce the material through the classification screens to capture material. Yield resulted in just about 50% of material below 2 microns after a first pass through the classification process. Regrinding of the material generated additional material; however, it is most advantageous to simply add the larger material to a new batch of carbonized material, and continually generating 60% of the total mass per run. This process is optimized for use when a nonaqueous solvent is not appropriate for the master batch, and where different sizes of materials are desired for different applications or master batches.

EXPERIMENT 5: WET MILLING WITH WATER

Wet Milling with Water: Wet milling adds water to the milling chamber before undergoing the milling as detailed in Experiment 3. This is detailed in FIG. 6, where we add hemp material to the furnace (11). We add this charred material to a mill (61), and we then add water to the mill (62). The material is then wet processed (63), where the ratio is 60% water to 40% hemp char and processed for between 3-7 hours at 30 Hz. The wet material then needs to be spray dried (64) and milled again because of reagglomeration, and then classified (65). The results of wet milling produce a highly uniform material, with production of more than 95% of the captured material below 2 microns. However, the sustainability numbers took a dramatic decrease as compared to any of the dry milling processes, as the yield was 50% lower than the dry processes (total yield about 25%). The reduction in yield is because after wet processing, the material needed to be spray dried (64), and this resulted 50% or more of the carbon being lost in the various tests. Indeed, the spray drying process simply blows away the smallest particles, which requires them to be captured from a debris field in the spray drying process. This introduces expense and difficulty in capture of the material. Furthermore, classifying the material proved difficult, and required a further remilling (66) under dry conditions, to reduce agglomeration of the previously wet-ground char. Each step is both expensive and resulted in loss of material that becomes unsustainable for production.

EXPERIMENT 6: WET MILLING WITH A NON-WATER SOLVENT

Figure 6:
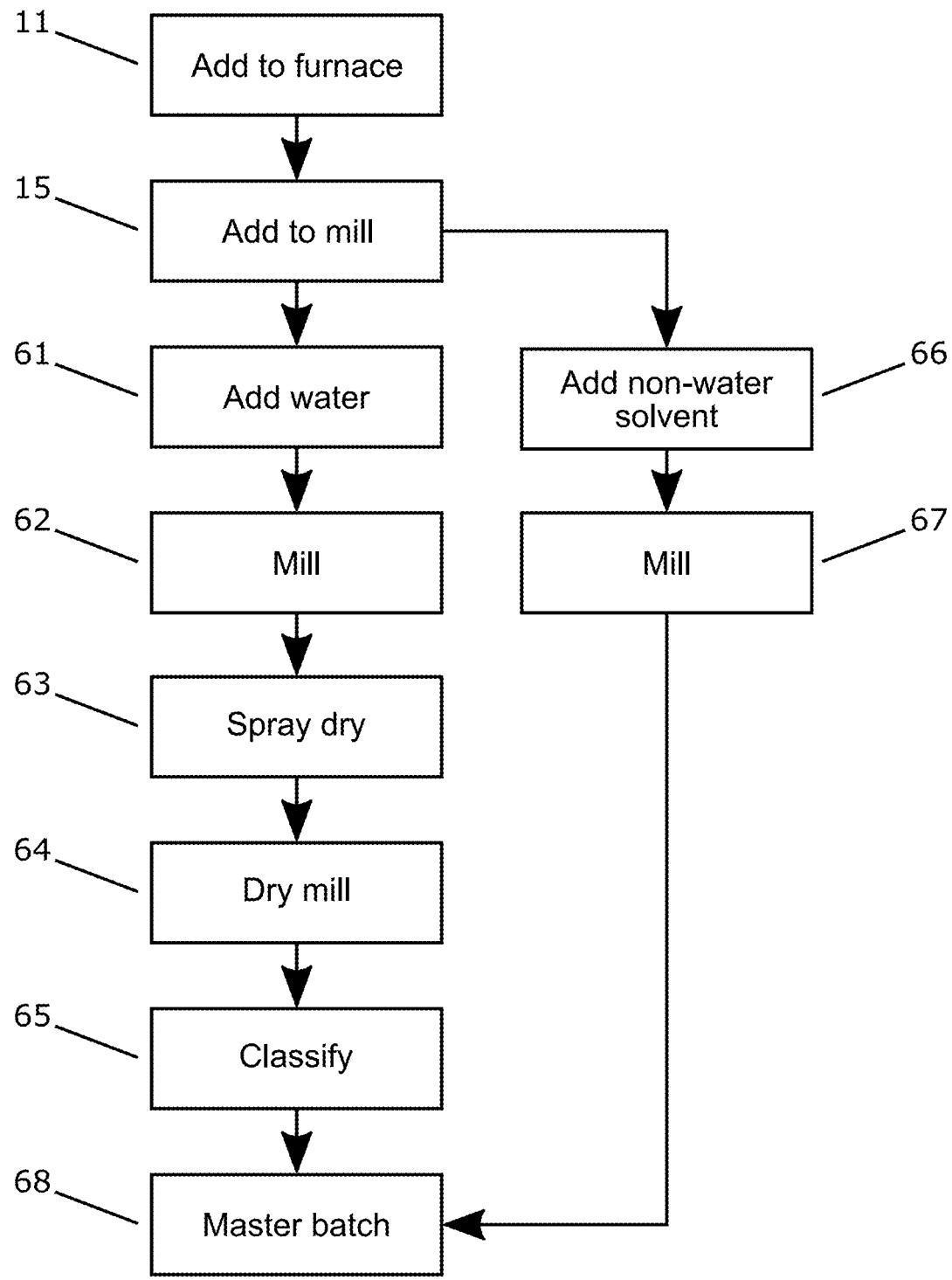
FIG. 6 depicts a flowchart of a wet milling process.

The process of milling with a liquid, but not water, is simplified, as depicted in FIG. 6. As depicted in FIG. 6, the material, instead of being milled with water, then dried, and then classified, is simply milled with the liquid solvent (66), milled (67) and then can be directly added to the master batch (68). The wet milling process is superior in many applications, as it reduces the ability of the hemp to "float" in the milling process and yields greater amounts of material at or below 2 microns, and in fact, more than 50% of the material is below 1 micron in size, and more than 90%, more than 95%, and more than 98% of the material was below 2 microns. Classification processes may still be carried out with the liquid, to remove those materials above 2 microns, but this step is not necessary in optimized protocols as it reduces yield. Using an alcohol solvent, acetone, an oil, other polar or nonpolar solvents, or combinations thereof, allowed the milled material to be directly added to a master batch. Preferably, an oil or solvent compatible with the final master batch is utilized. Total yield of material and material below 2 microns in size is greatest using this process, as little is lost in the milling and classification processes that are present with the fine and dry materials. This process is optimized, where such non-water solvents are suitable for addition into the master batch.

EXAMPLE 7: SUS-1100° C. BURNING

HEMP CARBONIZATION: A Thermo Scientific™ Lindberg/Blue M™ tube furnace with a 1000° C. temperature capability is used which can accommodate a 1" outer diameter tube. The stainless steel tube is fitted with compression fittings and a ⅛" nitrogen line. Seven to 10 g of homogeneously sized hemp stalk is packed into the tube, flushed with nitrogen, and heated from 25° C. to 1000° C. in 60 minutes (14.6° C./min heat ramp). The 1000° C. is held for 60 to 90 minutes. Nitrogen flow is maintained over the heating and hold times.

Additional Experimental Parameters

TABLE 3

| Process | Mill Details | Total Yield | Yield Under 2 microns with One Milling |
|---|---|---|---|
| Hand milling | Mortar and pestle for 3-5 minutes | 80 | 45 |
| Ball mill | 3-hour milling, no classification | 80 | 50 |
| Ball mill | 5-hour milling, no classification | 78 | 51 |
| Ball mill | 7-hour milling, no classification | 75 | 51 |
| Ball mill | 3-hour milling, 1 step classification | 80 | 50 |
| Ball mill | 3-hour milling, multistep classification | 79 | 53 |
| Wet mill | 3-hour wet milling in water and spray drying | 28 | 25 |
| Wet mill | 3-hour wet milling in oil | 92 | 92 |
| Wet mill | 3-hour wet milling in ethanol | 92 | 92 |
| Wet mill | 1-hour wet milling in ethanol | 93 | 90 |

Carbon Nanoparticle

Once the material is charred, activated (if necessary), and milled to an appropriate nanoparticle size within a specific classification it can be appropriately utilized in downstream processing such as a master batch. For example, it is preferred to use the material within polymer or particle formation to modify physical characteristics, such as mechanical characteristics (strength, weight, rigidity, etc.), or electrical properties. Factors that improve electrical conductivity include high temperature pyrolyzation, structure, and porosity. Where the particles are small and have an irregular polyhedron shape, their surface area is larger than otherwise and allows for greater contact between irregular polyhedron particles to generate or store charges. High structure means that the carbon agglomerates to form long and branched chains. Such a structure is ideal for conductive compounds. Higher particle porosity enables better electrical conductivity, and this is generated through increased temperature processing, (i.e., 1100° C. or higher).

Accordingly, in a preferred embodiment, the charred hemp is milled: The hemp char is milled to between 1-2 microns in size to create a fine powder of irregular polyhedron particles. Furthermore, the median particle size is preferably between 1-2 microns, and having more than 50, 60, 70, 80, 90, or 99% of the particles at a size of less than 2 microns. When using larger micron sizes, the size variability may increase slightly. However, at this preferred less than 2 microns in size, precision with regard to particle size of the material seeks percentages at less than 2 microns as indicated. Preferably, the process includes a screening or classification process, which removes particles larger than 2 microns or generates fractions to create a material of a substantially uniform particle size. The 2 microns and less particles are optimized for use in making materials specifically with certain polymers, and the larger particles are put through the grinding process again to obtain smaller particles. The processes described herein, allow for higher yields of the material, while generating at least 60% of the charred hemp at less than 2 microns in size, with more than 50%, 60%, 70%, 80%, 90%, 95%, and 99% of all particles between 1 and 2 microns in size of the less than 2-micron size fraction.

A preferred embodiment comprises a wet milling process comprising: processing a portion of hemp; charring said hemp at a temperature of greater than 1100° C. under low oxygen conditions to yield a char; placing said char into a mill with a portion of a solvent comprising less than 5% water; milling said material for at least 30 minutes to generate a nanoparticle char; combining the nanoparticle char with a polymer into a master batch. In a preferred embodiment, the solvent is an oil, a branched or linear alcohol, preferably a $C_1$-$C_{10}$ alcohol; acetone, or another suitable nonaqueous solvent.

A preferred embodiment comprises between 1 and 50 percent of a plurality of hemp particles, said plurality of hemp particles having an average particle size between 1-2 microns, and between 99 and 50 percent of at least one polymer. The materials are admixed until uniform into a master batch to be formulated into a subsequent material.

A preferred embodiment is directed towards a method of producing a hemp char material for master batch, comprising carbonized cellulosic material, specifically from hemp, comprising: carbonizing a cellulosic material by charring the cellulosic material at a temperature of about 900° C. under nitrogen for 60-90 minutes; reducing particle size of the charred cellulosic material by milling the material to a particle size, with 90% of particles of less than 10 microns, preferably with an average particle size of about 1-2 microns; combing a portion of the particles with at least a second component wherein said particles and said second component can be formed into a master batch for subsequent formation of materials. In preferred embodiments, the method above comprises between about 1 to 50% of the hemp particles with about 99 to 50% of at least one polymer.

What is claimed is:

1. A process for creating a mixture of micron-sized charred hemp comprising:
   rough cutting a portion of hemp stalk said hemp stalk comprising hemp hurd and hemp fibers;
   charring the portion of hemp stalk at a temperature of greater than 1100° C. for a period of at least one hour to create a char material;
   milling the char material by air jet milling, grinding, or ball milling to create a milled char having an irregular polyhedron shape; and
   collecting the milled char.

2. The process of claim 1 further comprising a first step of drying the hemp stalk before the rough cutting step.

3. The process of claim 1, wherein the temperature of greater than 1100° C. is held for at least one hour, and wherein the charring process is performed by addition of a non-oxygen gas to a heating chamber.

4. The process of claim 1, wherein the milling is performed in a high energy ball mill.

5. The process of claim 1, wherein the milled char is admixed with a polymer.

6. The process of claim 1, wherein the milled char is classified in a classifying system to create a desired particle size and wherein the desired fraction from the classification system comprises a 95% specific classification size of less than 2 microns and a 95% bell curve of 1.5 microns.

7. A process for creating a master batch comprising a plurality of hemp char particles and at least one polymer comprising:
- carbonizing a portion of a hemp material, said hemp material comprising hemp hurd and hemp fibers in a furnace, said furnace being flushed with nitrogen and then heated to a temperature of greater than 1100° C.;
- wherein the temperature of greater than 1100° C. is held for at least 60 minutes;
- maintaining nitrogen flow over the at least 60 minutes to maintain a low oxygen environment to create a char;
- removing the char from the furnace and allowing it to cool;
- milling the char by a milling process for a period sufficient to reduce the char into a plurality of char particles having an irregular polyhedron shape by air jet milling or ball milling;
- combining the char particles with the at least one polymer, wherein the ratio of char particles to polymer is between 10:90 and 50:50; and
- mixing the at least one polymer and the char particles to form the master batch.

8. The method of claim 7, wherein at least 90% of all of the char particles are less than 10 microns in size.

9. The method of claim 7, wherein the average particle size of all of the char particles is between 1 and 2 microns, and wherein at least 95% of all of the char particles are less than 2 microns in size.

10. The method of claim 7, wherein the milling process is a wet milling process.

11. The method of claim 10, wherein the wet milling process comprises a nonaqueous solvent.

12. The method of claim 7, wherein the char particles are classified to remove particles of more than 2 microns in size.

13. A process of forming a plurality of charred hemp particles having more than 50% of particles formed between 1 and 2 microns in size comprising:
- drying cut hemp stalk on a field for a period of less than 7 days, said hemp stalk comprising hemp hurd and hemp fibers;
- pyrolyzing the dried hemp stalk at a temperature of greater than 1100° C. to create a char;
- adding the char to a grinding vessel and mechanically grinding the char for a period of between 1 and 16 hours by grinding, air jet milling, or ball milling the char to form a ground char having an irregular polyhedron shape;
- screening the ground char with a 2-micron screen to create a screened char of less than 2 microns; and
- capturing the screened char of less than 2 microns.

14. The process of claim 13, wherein the grinding vessel is a steel vessel with steel grinding balls.

15. The process of claim 13, wherein the grinding is dry grinding.

16. The process of claim 13, wherein the grinding is wet grinding.

17. The process of claim 16, wherein the wet grinding is performed for a first duration of between 1 and 16 hours and is followed by a step of drying to create an agglomerated ground char and regrinding the agglomerated ground char in a dry grinding process.

18. The process of claim 15 further comprising separating the material resulting from the 2-micron screen into particles smaller than 2 microns and particles larger than 2 microns and regrinding the particles larger than 2 microns.

* * * * *